United States Patent
Sarkar et al.

(10) Patent No.: US 10,360,193 B2
(45) Date of Patent: Jul. 23, 2019

(54) METHOD AND APPARATUS FOR SMART ARCHIVING AND ANALYTICS

(71) Applicant: Western Digital Technologies, Inc., Irvine, CA (US)

(72) Inventors: Sanhita Sarkar, Fremont, CA (US); Kannan J. Somangili, Pleasanton, CA (US); Shanker Valipireddy, San Jose, CA (US); Harold Woods, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 154 days.

(21) Appl. No.: 15/468,245

(22) Filed: Mar. 24, 2017

(65) Prior Publication Data
US 2018/0276256 A1    Sep. 27, 2018

(51) Int. Cl.
| | | |
|---|---|---|
| *G06F 16/00* | (2019.01) | |
| *G06F 16/21* | (2019.01) | |
| *G06N 20/00* | (2019.01) | |
| *G06F 16/28* | (2019.01) | |
| *G06F 16/25* | (2019.01) | |

(52) U.S. Cl.
CPC .......... *G06F 16/219* (2019.01); *G06F 16/254* (2019.01); *G06F 16/285* (2019.01); *G06N 20/00* (2019.01); *G06F 2216/03* (2013.01)

(58) Field of Classification Search
CPC .......... G06F 16/219; G06F 16/285; G06F 17/30309; G06F 2216/03; G06F 16/113; G06F 16/174; G06F 16/1748; G06F 16/254; G06F 3/0649; G06F 11/1446; G06N 20/00
See application file for complete search history.

(56) References Cited

U.S. PATENT DOCUMENTS

| | | |
|---|---|---|
| 7,113,964 B1 | 9/2006 | Bequet et al. |
| 8,140,787 B2 | 3/2012 | Bondurant et al. |
| 8,229,836 B2 | 7/2012 | Chehade et al. |
| 8,560,879 B1 * | 10/2013 | Goel .................. G06F 11/1088 714/6.1 |

(Continued)

OTHER PUBLICATIONS

Chen et al., Data-intensive applications, challenges, techniques and technologies: A survey on Big Data, 34 pages (Year: 2014).*

(Continued)

*Primary Examiner* — Noosha Arjomandi
(74) *Attorney, Agent, or Firm* — Patent Law Works LLP

(57) ABSTRACT

A system and method for archiving and analyzing data are disclosed. The system receives event data associated with a process; responsive to receiving the event data, determines process data associated with the process; generates process metadata from the event data and the process data; and stores the event data, the process data, and the process metadata in a data repository organized by the process metadata. Since the process data is determined early on in the data pipeline, the system can significantly reduce the amount of computation required for generating data analytics. The system is also capable of providing analytic results computed against a massive amount of archived data in real-time or near real-time as user requests are initiated. Efficiency of process mining and process optimization is also improved due to enhanced information stored for archived processes.

19 Claims, 11 Drawing Sheets

(56) References Cited

U.S. PATENT DOCUMENTS

| | | | |
|---|---|---|---|
| 8,983,913 | B2 | 3/2015 | Held |
| 9,026,467 | B2 | 5/2015 | Bammi et al. |
| 9,275,086 | B2* | 3/2016 | Kumarasamy ...... G06F 16/2365 |
| 9,325,791 | B1* | 4/2016 | Blahaerath .......... H04L 67/1097 |
| 9,626,373 | B2* | 4/2017 | Ram ................. G06F 17/30159 |
| 9,836,243 | B1* | 12/2017 | Chanler ............. G11C 16/3495 |
| 9,881,038 | B2* | 1/2018 | Devasthali ............ G06F 17/303 |
| 2007/0031845 | A1* | 2/2007 | Denise ................. C12O 1/6876 435/6.12 |
| 2011/0246340 | A1 | 10/2011 | Dahod et al. |
| 2012/0124105 | A1* | 5/2012 | Provenzano ........ G06F 11/1453 707/813 |
| 2013/0073673 | A1 | 3/2013 | McMahon et al. |
| 2013/0254402 | A1* | 9/2013 | Vibhor ............. G06Q 10/06316 709/226 |
| 2014/0156777 | A1* | 6/2014 | Subbiah .............. H04L 67/1097 709/213 |
| 2014/0222349 | A1* | 8/2014 | Higgins ................. G16B 20/00 702/19 |
| 2014/0365442 | A1 | 12/2014 | Subramanian et al. |
| 2015/0012498 | A1* | 1/2015 | Oberoi .............. G06F 17/30339 707/667 |
| 2015/0278335 | A1 | 10/2015 | Opitz et al. |
| 2016/0070766 | A1* | 3/2016 | Kathpal ............ G06F 17/30073 707/602 |
| 2016/0085763 | A1* | 3/2016 | Tatourian ................ H04L 67/10 707/662 |
| 2016/0371284 | A1 | 12/2016 | Malone |
| 2017/0091200 | A1 | 3/2017 | El-Mankabady et al. |
| 2017/0177599 | A1* | 6/2017 | Jain ........................ G06F 16/182 |
| 2017/0180287 | A1* | 6/2017 | Patel ....................... H04W 4/90 |
| 2018/0196839 | A1 | 7/2018 | Clapham et al. |

OTHER PUBLICATIONS

Van Der Aalst et al. "Process Mining Manifesto" dated 2011, 26 pages.

Caron et al. "Applications of Business Process Analytics and Mining for Internal Control" dated 2012, 6 pages, Downloaded from <http://www.isaca.org/Journal/archives/2012/Volume4/Pages/applicationsofBusinessProcessAnalyticsandMiningforInternalControl.aspx> ISACA.

Anonymous "Unlock the Business Value of Archived Data with Cloudera and Hunk: Splunk Analytics for Hadoop" dated 2014, 2 pages, Cloudera, Inc.

Anonymous "TCS Active Archive" dated 2014, 2 pages, TATA Consultancy Services.

Anonymous "Enterprise Data Hub: A New Way to Work with Data" dated 2014, 4 pages, Cloudera, Inc.

Anonymous "Full-Fidelity Analytics and Regulatory Compliance in Financial Services" dated 2015, 5 pages, Cloudera, Inc.

Unknown, Analytics Apache MapReduce, What is MapReduce?, IBM, www-01.ibm.com/software/data/infosphere/hadoop/mapreduce/.

Hausenblas, M. and Bijnens, N., Lambda Architecture, Sitewide ATOM, http://lambda-architecture.net/.

Forgeat, J., Data Processing Architectures—Lambda and Kappa, Ericsson Research Blog, Nov. 19, 2015, https://www.ericsson.com/research-blog/data-knowledge/data-processing-architectures-lambda-and-kappa/.

Piekos, J., Simplifying the (complex) Lambda Architecture, VOLTDB, Dec. 1, 2014, https://www.voltdb.com/blog/simplifying-complex-lambda-architecture.

Feller, E., Data Processing Architectures—Lambda and Kappa Examples, Ericsson Research Blog, Nov. 23, 2015, https://www.ericsson.com/research-blog/data-knowledge/data-processing-architectures-lambda-and-kappa-examples/.

Unknown, Hive—Partitioning, Tutorials Point, https://www.tutorialspoint.com/hive/hive_partitioning.htm.

Unknown, OpenStack, Wikipedia, Wikimedia Foundation, Nov. 19, 2018, https://en.wikipedia.org/wiki/OpenStack#Networking_.28Neutron.29.

Unknown, What is Open VSwitch (OVS)?, sdx Central, https://www.sdxcentral.com/cloud/open-source/definitions/what-is-open-vswitch/.

Ho, R., Pragmatic Programming Techniques, Lambda Architecture Principles, Aug. 17, 2014, http://horicky.blogspot.com/2014/08/lambda-architecture-principles.html.

Finley, J., The Lambda Architecture: Principles for Architecting Realtime Big Data Systems. Dec. 7, 2012, http://ameskinley.tumblr.com/post/37398560534/the-lambda-architecture-principles-for.

Unknown, Clustering Models, IBM Knowledge Center, IBM Corporation, https://www.ibm.com/support/knowledgecenter/SS3RA7_15.0.0/com.ibm.spss.modeler.help/nodes_clusteringmodels.htm.

Unknown, K-Means Node, IBM Knowledge Center, IBM Corporation, https://www.ibm.com/support/knowledgecenter/en/SS3RA7_15.0.0/com.ibm.spss.modeler.help/trainkmeansnode_general.htm.

Unknown, Hortonworks Data Platform Plugin-Sahara, Openstack, 2014, http://docs.openstack.org/developer/sahara/icehouse/userdoc/hdp_plugin.html.

Jain, R., How Lambda Architecture Can Analyze Big Data Batches in Near Real-Time, DataInformed, Oct. 8, 2013, http://data-informed.com/lambda-architecture-can-analyze-big-data-batches-near-real-time/.

BUYYA, R., et al., Big Data Principles and Paradigms, 2016, pp. 31-32, ISBN: 978-0-12-805394-2, Todd Green, India.

Bridewell, W., et al., Inductive process modeling, paper, Nov. 28, 2007, pp. 1-32 , DOI 10.1007/s10994-007-5042-6, Springer.

Jenkena, B. et al., Self-optimizing cutting process using learning process models, 3rd International Conference on System-integrated Intelligence: New Challenges for Product and Production Engineering, SysInt, 2016, pp. 221-226, Procedia Technology 26, Elsevier Ltd., Germany.

* cited by examiner

METHOD AND APPARATUS FOR SMART ARCHIVING AND ANALYTICS

BACKGROUND

The present disclosure relates to a system and method for archiving and analyzing big data at rest or in transit. In particular, the present disclosure relates to a system and method for archiving event data and process data, and providing analytic results generated from the archived data.

Data is generated by processes. Entities such as manufacturers, business enterprises, financial systems, biological systems, physical systems, smart homes, smart cities, etc. implement complex business processes that continuously generate massive amount of data in real-time. The generated data reflects the properties of the corresponding processes, and thus, analysis of such data is important for process optimization and process mining.

Existing solutions for archiving big data often store event data coming in from data sources in archive storage before any analysis of the data is performed. This approach generally requires a significant amount of time to analyze the data to perform data analytics, and therefore is unable to provide analytic results in a timely manner when there is latency in getting the data stored to the archive storage.

SUMMARY

The techniques introduced herein overcome the deficiencies and limitations of the prior art, at least in part, with a system and a method for archiving and analyzing data. In one embodiment, a system comprises a data repository for storing data, a data ingestion module having an input coupled to receive event data associated with a process and an output coupled to the data repository, the data ingestion module operable to receive the event data and temporarily storing the event data, and a process archiving module having an input coupled to the data ingestion module to receive the event data associated with the process and an output coupled to the data repository, the process archiving module operable to receive the event data, determine process data associated with the process, generate process metadata from the event data and the process data, and store the event data, the process data, and the process metadata in the data repository.

In another embodiment, the method includes receiving event data associated with a process; responsive to receiving the event data, determining process data associated with the process; generating process metadata from the event data and the process data; and storing the event data, the process data, and the process metadata in a data repository organized by the process metadata.

Other embodiments include corresponding systems, apparatus, and computer program products, configured to perform the actions of the methods, encoded on computer storage devices. These and other implementations may optionally include one or more of the following features and/or operations.

For example, the process archiving module is further operable to generate the process metadata by applying machine learning to the event data and the process data to generate the process metadata; the process archiving module is further operable to generate a first dataset entry for the process, the first dataset entry including the process metadata, retrieve an archived data model describing second dataset entries in the data repository, determine a relationship between the first dataset entry and the second dataset entries by applying the archived data model to the first dataset entry, and store the first dataset entry of the process in the data repository based on the relationship between the first dataset entry and the second dataset entries; the process metadata includes a process parameter describing the process, and the process archiving module is further operable to apply the archived data model to the first dataset entry by identifying a cluster of second dataset entries for the first dataset entry using a clustering algorithm, the clustering algorithm being used for clustering based on the process parameter; the system also includes a real-time analysis module coupled to the data repository to receive dataset entries, the real-time analysis module is operable to generate a real-time view associated with one or more analytic outputs using the dataset entries, and store the real-time view in a process storage; the system also includes a batch analysis module coupled to the data repository to receive dataset entries, the batch analysis module is operable to pre-compute a batch view associated with one or more analytic outputs using the dataset entries, and store the batch view in a process storage; the system also includes an archived data managing module communicatively coupled to the data repository, the archived data managing module is operable to determine a consuming pattern associated with dataset entries in the data repository, determine a process parameter based on the consuming pattern, and cluster the dataset entries in the data repository based on the determined process parameter to generate the archived data model; or wherein the process archiving module is further operable to determine a value of a data attribute from the event data associated with the process and generate a first dataset entry, the first dataset entry including the determined value of the data attribute, and the system further comprises: an archived data managing module configured to organize second dataset entries in the data repository based on the data attribute; an analytic module configured to store a pre-computed view associated with an analytic output in an analytic profile storage to generate a unified view; and a profile enabling module coupled to and controlling the process archiving module, the archived data managing module, and the analytic module, the profile enabling module configured to receive a selected analytic profile, and identify the data attribute and the analytic output associated with the analytic profile.

For example, the method may also comprise generating a first dataset entry for the process, the first dataset entry including the event data, the process data, and the process metadata; retrieving an archived data model describing second dataset entries in the data repository; and determining a relationship between the first dataset entry and the second dataset entries by applying the archived data model to the first dataset entry; wherein storing the event data, the process data, and the process metadata includes storing the first dataset entry in the data repository based on the relationship between the first dataset entry and the second dataset entries.

For example, the process metadata may include a process parameter describing the process; and determining the relationship between the first dataset entry and the second dataset entries by applying the archived data model to the first dataset entry includes identifying a cluster of second dataset entries for the first dataset entry using a clustering algorithm, the clustering algorithm being used for clustering based on the process parameter.

For example, storing the first dataset entry in the data repository includes determining a dataset associated with the cluster of second dataset entries; and updating the determined dataset to include the first dataset entry.

For example, the method also includes receiving a selection of an analytic profile, the analytic profile specifying an analytic output to be provided; identifying a data attribute associated with the analytic profile; and wherein generating the first dataset entry also includes determining a value of the data attribute from the event data associated with the process; and generating the first dataset entry for the process, the first dataset entry including the determined value of the data attribute.

For example, the method also includes organizing the second dataset entries in the data repository based on the data attribute; and storing a pre-computed view associated with the analytic output in an analytic profile storage to generate a unified view for the analytic output.

For example, the method also includes determining a consuming pattern associated with dataset entries in the data repository; determining a process parameter based on the consuming pattern; and clustering the dataset entries based on the determined process parameter to generate an archived data model.

For example, the archived data model includes a first cluster of dataset entries and a second cluster of dataset entries and the method also includes aggregating the first cluster of dataset entries into a first dataset; aggregating the second cluster of dataset entries into a second dataset; and storing the first dataset in a first folder and the second dataset in a second folder of the data repository, the first folder and the second folder being organized based on the archived data model.

The technology presented in the present disclosure is particularly advantageous in a number of respects. In particular, prior to storing event data generated by a process and coming in from a data source, the described technology determines process data associated with the same process. The incoming event data and the determined process data is then archived in the archive storage as a process or according to process parameters. Since the process data is extracted early on in the data pipeline, the present technology can significantly reduce the amount of computation required for generating data analytics, and is capable of providing analytic results (e.g., quality metric, defect pattern, etc.) against a massive amount of archived data in real-time or near real-time. Efficiency of process mining and process optimization is also improved due to enhanced information stored for archived processes. In addition, the present technology applies a machine learning algorithm to event data and process data prior to archiving the process to enable advantageous data placement within the archive storage for execution of data queries. The technology disclosed herein is applicable to cloud-based analytic platforms and analytic platforms running on premise.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

A system and a method for archiving business processes with incoming event data and process data, and applying analysis to the archived processes are described below. The archiving can occur within a data repository, as a component within a Data Lake.

Analyzing data generated by a process often results in characteristics of the process being discovered. In order to obtain a comprehensive insight into the process, it is important to take into consideration the information of the process that generated the data when performing such analysis. The technology described herein is capable of archiving business processes not only with event data generated by the process but also with process data describing the process itself. Process data is determined when the data comes in from various data sources, prior to data archiving in a data repository which can reside in a Data Lake, and prior to data mining computations whether in real-time or in the near future. Accordingly, the data associated with different business processes can be organized optimally within the archive storage, thereby allowing faster data query. This implementation is particularly advantageous when data analytics against large and diverse datasets are expected to be performed within a limited amount of time or in near real-time before the data becomes obsolete, and when fast correlations with historical data need to be provided quickly in order to make actionable decisions. Examples of these situations may include, but are not limited to, detecting occurrence of frauds in financial analytics, analyzing patient data for healthcare treatment, detecting intrusion in network security and defense, identifying hot trends in social networks, detecting defect patterns in manufacturing cycles, etc.

Figure 1:
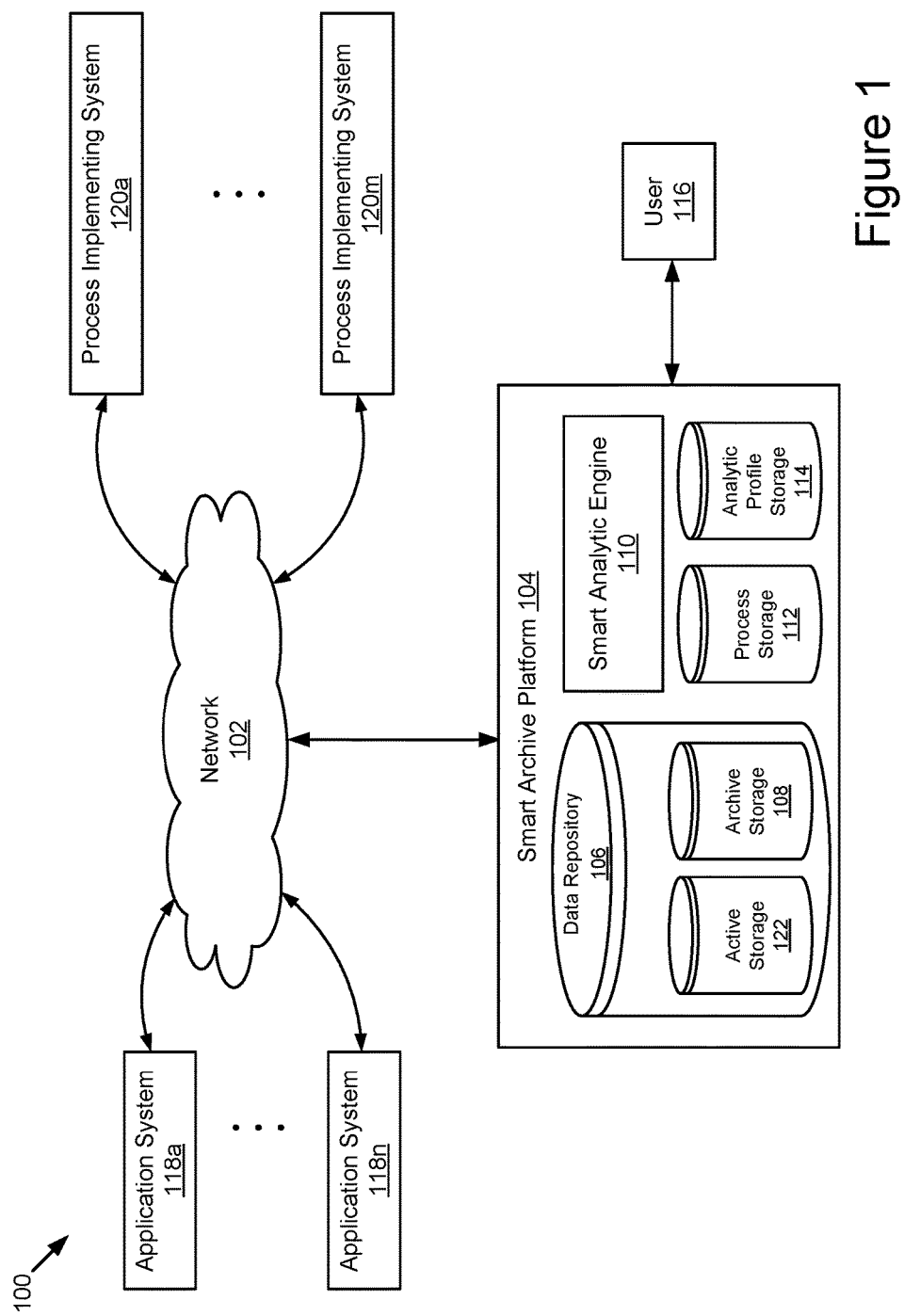
FIG. 1 is a high-level block diagram illustrating one embodiment of a system for archiving and analyzing data.

FIG. 1 is a high-level block diagram illustrating one embodiment of a system 100 for archiving and analyzing data. The illustrated system 100 may include application systems 118a . . . 118n, process implementing systems 120a . . . 120m, and a smart archive platform 104 that can be accessed by a user 116. Although only a single smart archive platform 104 is shown in FIG. 1, it should be understood that the system 100 depicted in FIG. 1 is provided by way of example and may include any number of smart archive platforms 104 and users 116. The term platform as used in this application is defined as any computing system including some or all of the components described herein with reference to FIGS. 1 and 2 whether it be located on premises or in a cloud computing environment (e.g., on-demand access to a shared pool of configurable computing resources—computer networks, servers, storage, applications and services available via the internet or other network). In FIG. 1 and the remaining figures, a letter after a reference number, e.g., "118a," represents a reference to the element having that particular reference number. A reference number in the text without a following letter, e.g., "118," represents a general reference to instances of the element bearing that reference number. In the illustrated embodiment, these entities of the system 100 are communicatively coupled via a network 102.

The network 102 can be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some embodiments, the network 102 may be a peer-to-peer network. The network 102 may also be coupled to or include portions of a telecommunications network for sending data in a variety of different communication protocols. In some embodiments, the network 102 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 102 coupled to the application systems 118, the process implementing systems 120, and smart archive platform 104, in practice, one or more networks 102 can be connected to these entities.

The application system 118 and the process implementing system 120 may include a hardware server and/or virtual server with a processor, a memory, and network communication capabilities (e.g., a communication unit). The application system 118 and the process implementing system 120 may be communicatively coupled to the network 102 to send and receive data to and from the smart archive platform 104. The application systems 118 may provide one or more software applications such as communication applications, financial applications, patient monitoring applications, etc. The process implementing systems 120 may include operational systems that perform different processes such as social network systems, manufacturers, enterprises, biological systems, physical systems, smart homes, smart cities, etc.

In some embodiments, the application system 118 and the process implementing system 120 may execute one or more business processes. In this present disclosure, the business processes may refer to any processes that are implemented by these entities as part of their operations. In general, these processes often generate a massive amount of event data associated with a large number of events that occur during the process. For example, the event in a financial application may be a user initiates a stock transaction and the event data for such event may include a transaction record. In another example, the event in a social network system may be a user performs an interaction on the social network and the corresponding event data may include a type of action (e.g., click, page view, comment, re-share, endorsement, etc.), content items, user ID, time, location, etc. associated with the user interaction. In another example, the event in a manufacturing process may be an equipment failure and the event data generated for such event may include process ID, product code, equipment ID, error code, site (e.g., Singapore), time, status report of products being made when the failure occurred, etc. In some embodiments, the application system 118 and the process implementing system 120 may transmit the event data generated by the business processes to the smart archive platform 104 via the network 102.

The smart archive platform 104 may be, or may be implemented by, a computing device including a processor, a memory, applications, a database, and network communication capabilities. In some embodiments, the computing device may be a data center on premise of the organization that performs the process. In other embodiments, the computing device may be physical/virtual server or a cluster of physical/virtual servers provided by a third-party cloud computing service. In some embodiments, the smart archive platform 104 sends and receives data to and from other entities of the system 100 via the network 102. For example, the smart archive platform 104 may receive data including event data generated by the business processes from the application system 118 and/or the process implementing system 120. In another example, the smart archive platform 104 may receive data including configuration settings or selection of analytic profiles from the user 116 and send analytic results to the user 116, either directly or via the network 102.

In some embodiments, the smart archive platform 104 provides the functionality for archiving and analyzing data associated with one or more business processes in order to provide the user 116 with metrics of interest in real-time or near real-time. In some embodiments, the smart archive platform 104 may be a component within the Data Lake. As depicted in FIG. 1, the smart archive platform 104 may include an instance of a smart analytic engine 110, a process storage 112, an analytic profile storage 114, and a data repository 106 which includes an active storage 122 and an archive storage 108.

The data repository 106 stores data coming in from various data sources. For example, the data repository 106 may store event data generated by the application system 118 and/or the process implementing system 120. In some embodiments, the data repository 106 may be a component within the Data Lake. In the Data Lake, a large body of incoming data is stored in its original form as generated by different entities and organizations. In some embodiments, the data repository 106 may store the collected data in different types of storage. For example, as depicted in FIG. 1, the data repository 106 may include the active storage 122 and the archive storage 108. In some embodiments, the active storage 122 may be formed with high performance storage devices (e.g., Solid State Drives—SSDs) and may be used to store frequently consumed data. The archive storage 108 may be formed using lower performance storage devices (e.g., Hard Disk Drives—HDDs) as compared to the active storage 122. In some embodiments, the data may be retained in the active storage 122 to allow faster access until the frequency of access to the data satisfies a threshold (e.g. falls below some frequency of access) at which the data may be moved to the archive storage 108. As described in further detail below, the data stored in the archive storage 108 may be subjected to data analytics so that the entities and organizations can get comprehensive insights into their processes and optimize them accordingly.

The process storage 112 stores pre-computed results (also referred to herein as pre-computed views) for one or more analytic requests. In some embodiments, the pre-computed views may include batch views and real-time views. In some embodiments, a batch view may be a result (e.g., a metric, a data model, etc.) pre-computed for an analytic request using some or all data that has been archived for the corresponding process up to the point when a cycle of batch computation begins. Due to a large amount of data to be analyzed, one cycle to compute a batch view often takes a long time to complete. As a result, even a newly generated batch view is likely outdated because the process keeps running and generating event data while the batch cycle is in progress. In some embodiments, the pre-computed batch views may be stored in a batch serving database of the process storage 112. In some embodiments, for a single application or business process, multiple batch views corresponding to various analytic outputs may be pre-computed and stored in the batch serving database. As an example, for a particular manufacturer, the batch serving database may include a batch view indicating an average time between equipment failures and another batch view indicating a percentage of detected defects associated with each product. In some embodiment, the batch views computed for different applications and processes may be indexed and stored in the same batch serving database.

In some embodiments, a real-time view may be a result (e.g., a metric, a data model, etc.) pre-computed for an analytic request using data that recently arrived or archived for the corresponding process and that data is therefore not yet included in batch computation. With the recent data reflected in the real-time views, out-of-date issue caused by heavy computation of batch view processing can be addressed. In some embodiments, the pre-computed real-time views may be stored in a real-time serving database in the process storage 112. Similar to the batch views, for a single application or business process, multiple real-time views corresponding to various analytic outputs may be pre-computed and stored in the real-time serving database. In some embodiments, the real-time serving database may store real-time views associated with different applications and processes using proper index technique.

The analytic profile storage 114 stores one or more analytic profiles. For example, the analytic profile storage 114 may store profiles for data center operation, profiles for workload management, profiles for graphic metrics, profiles for standard metrics (e.g., Six Sigma metrics, Continuous Process Improvement (CPI) metrics, Total Quality Management (TQM) metrics), etc. In some embodiments, the analytic profile may specify analytic outputs to be computed and what data attributes are needed to compute the analytic outputs. These data attributes may be extracted (e.g., from the event data generated by the applications system 118 and the process implementing system 120) and stored in the archive storage 108. As an example, a data center operation profile may specify the following metrics as analytic output:

Mean Time Between Failures (MTBF): an average time between equipment failures over a given period of time;

Corporate Average Data Efficiency (CADE): energy efficiency of the data center across corporate footprint;

Power Usage Effectiveness (PUE): ratio of total power usage by the data center to power usage by equipment; and Data Center Infrastructure Efficiency (DCiE): percentage of electrical power used by data center equipment.

In order to compute those metrics, the data center operation profile may provide a list of data attributes to be collected including, for example, a timestamp of equipment failure, power usage by each equipment, electrical power usage of the data center, total power usage of the data center, etc. In some embodiments, the analytic profile storage 114 may also store the batch view(s) and the real-time view(s) of the currently enabled analytic profile(s).

The smart analytic engine 110 may include software and/or logic to provide the functionality for optimally storing data associated with processes in the archive storage 108 and generating analytic results for these processes from the archived data. In some embodiments, the smart analytic engine 110 can be implemented to generate analytic results from the batch and real-time views stored in the analytic profile storage 114. In some embodiments, the smart analytic engine 110 can be implemented using programmable or specialized hardware, for example, a field-programmable gate array (FPGA) or an application-specific integrated circuit (ASIC). In some embodiments, the smart analytic engine 110 can be implemented using a combination of hardware and software. In some embodiments, the smart analytic engine 110 can be implemented as software hosted as a cloud service and made available to multiple customers. In some embodiments, the smart analytic engine 110 may be stored and executed on an on-premise server.

In some embodiments, the smart analytic engine 110 may receive event data generated by business processes from the application system 118 and/or the process implementing system 120. For example, the smart analytic engine 110 may receive report documents (e.g., click logs, periodical summary reports, etc.) and/or data files (e.g., images, binary files, transaction records, etc.) associated with the business processes. As the event data is ingested from the application system 118 and the process implementing system 120, the smart analytic engine 110 may determine process data associated with the business process. For example, the smart analytic engine 110 may determine a process ID, a phase ID, an arrival timestamp, etc. associated with the processes. The smart analytic engine 110 may generate process metadata from the event data and the process data. For example, the smart analytic engine 110 may infer a missing data attribute from the data attributes included in the event data and process data, substitute the data attributes with ones in complete format, convert the data attributes into alternative units, etc. The smart analytic engine 110 may generate a first dataset entry for the process, the first dataset entry may include the event data, the process data, and the process metadata. In some embodiments, the smart analytic engine 110 may receive an archived data model describing second dataset entries in the archive storage 108 and apply the archived data model to the first dataset entry to determine a relationship between the first dataset entry and the second dataset entries. In some embodiments, the smart analytic engine 110 may store the first dataset entry in the archive storage 108 based on the relationship between the first dataset entry and the second dataset entries. The operation of the smart analytic engine 110 and the functions listed above are described below in more detail with reference to FIGS. 2-10.

Figure 2:
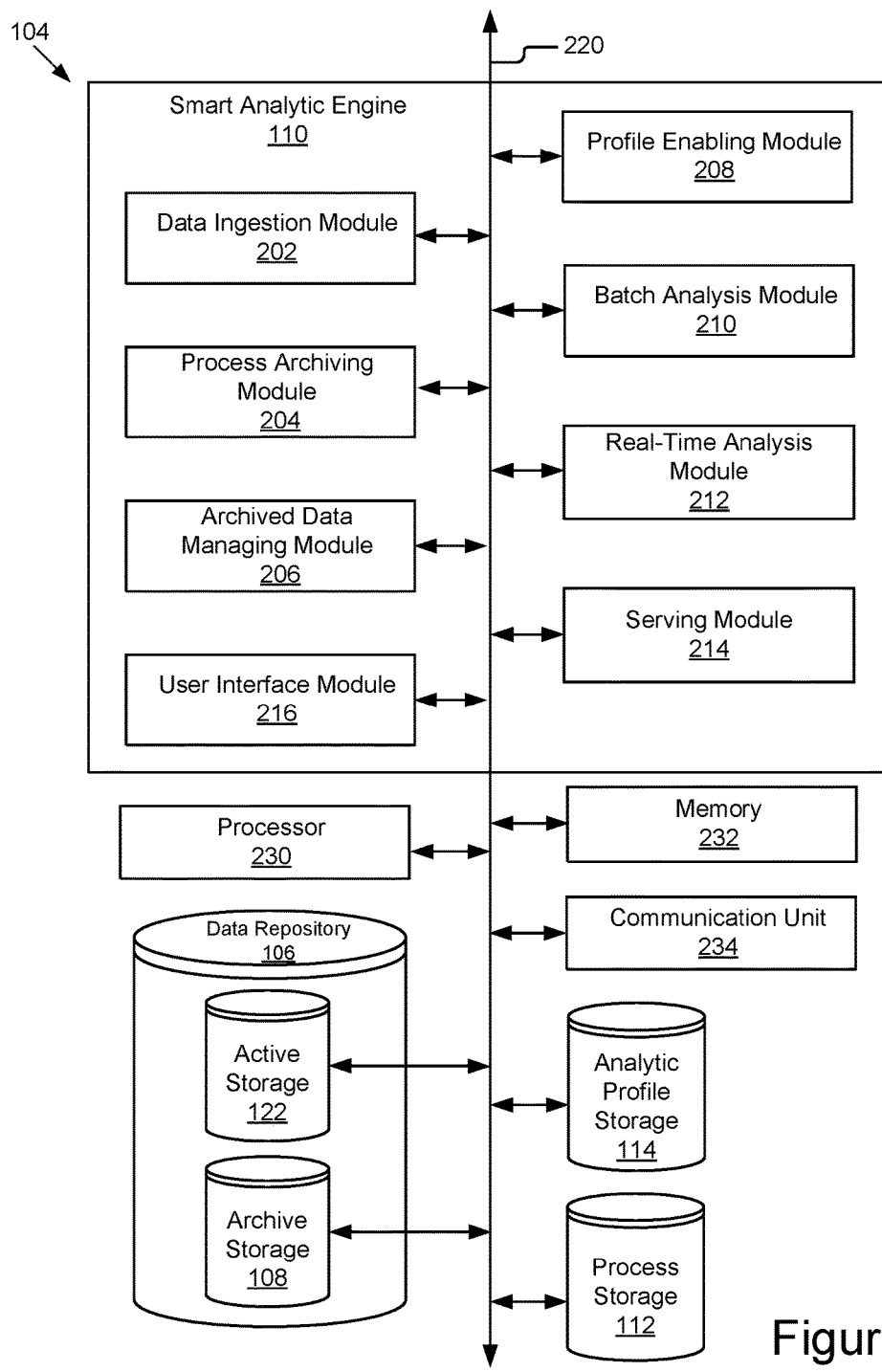
FIG. 2 is a block diagram illustrating an embodiment of a smart archive platform including a smart analytic engine.

FIG. 2 is a block diagram illustrating one embodiment of the smart archive platform 104 including a smart analytic engine 110. The smart archive platform 104 may also include a processor 230, a memory 232, a communication unit 234, the active storage 122, the archive storage 108, the process storage 112, and the analytic profile storage 114 according to some examples. The components of the smart archive platform 104 are communicatively coupled to a bus or software communication mechanism 220 for communication with each other. In some embodiments, the smart archive platform 104 may be, or may be implemented on, an on-premises server or infrastructure of a cloud computing service.

The processor 230 may execute software instructions by performing various input/output, logical, and/or mathematical operations. The processor 230 may have various computing architectures to process data signals including, for example, a complex instruction set computer (CISC) architecture, a reduced instruction set computer (RISC) architecture, and/or an architecture implementing a combination of instruction sets. The processor 230 may be physical and/or virtual, and may include a single processing unit or a plurality of processing units and/or cores. In some implementations, the processor 230 may be capable of generating and providing electronic display signals (e.g., a visual dashboard) to a display device, receiving and processing continuous stream of data, performing complex tasks including various types of data attribute extraction and query execution, etc. In some implementations, the processor 230 may be coupled to the active storage 122, the archive storage 108, the process storage 112, and the analytic profile storage 114 via the bus 220 to access data and instructions therefrom and store data therein. The bus 220 may couple the processor 230 to the other components of the smart archive platform 104 including, for example, the memory 232, the communication unit 234, and the smart analytic engine 110. It will be apparent to one skilled in the art that other processors, operating systems, sensors, displays and physical configurations are possible.

The memory 232 may store and provide access to data for the other components of the smart archive platform 104. The memory 232 may be included in a single computing device or distributed among a plurality of computing devices as discussed elsewhere herein. In some implementations, the memory 232 may store instructions and/or data that may be executed by the processor 230. The instructions and/or data may include code for performing the techniques described herein. For example, in one embodiment, the memory 232 may store the smart analytic engine 110. The memory 232 is also capable of storing other instructions and data, including, e.g., an operating system, hardware drivers, other software applications, databases, etc. For example, in one embodiment, the memory 232 may store an archived data model describing the data archived in the archive storage 108. The memory 232 may be coupled to the bus 220 for communication with the processor 230 and the other components of the smart archive platform 104.

The memory 232 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 230. In some implementations, the memory 232 may include one or more of volatile memory and non-volatile memory. For example, the memory 232 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.). It should be understood that the memory 232 may be a single device or may include multiple types of devices and configurations.

The communication unit 234 is hardware for receiving and transmitting data by linking the processor 230 to the network 102 and other processing systems. The communication unit 234 receives data such as event data from the application system 118 and the process implementing system 120, and transmits the event data to the data ingestion module 202. The communication unit 234 also transmits information such as analytic results to a client device associated with the user 116 for display. The communication unit 234 is coupled to the bus 220. In one embodiment, the communication unit 234 may include a port for direct physical connection to the client devices or to another communication channel. For example, the communication unit 234 may include an RJ45 port or similar port for wired communication with the client devices. In another embodiment, the communication unit 234 may include a wireless transceiver (not shown) for exchanging data with the client devices or any other communication channel using one or more wireless communication methods, such as IEEE 802.11, IEEE 802.16, Bluetooth® or another suitable wireless communication method.

In yet another embodiment, the communication unit 234 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 234 may include a wired port and a wireless transceiver. The communication unit 234 also provides other conventional connections to the network 102 for distribution of files and/or media objects using standard network protocols such as TCP/IP, HTTP, HTTPS and SMTP as will be understood to those skilled in the art.

The active storage 122, the archive storage 108, the process storage 112, and the analytic profile storage 114 are non-transitory memory that stores data for providing the functionality described herein. The active storage 122, the archive storage 108, the process storage 112, and the analytic profile storage 114 may be a dynamic random access memory (DRAM) device, a static random access memory (SRAM) device, flash memory or some other memory devices. In some embodiments, the active storage 122, the archive storage 108, the process storage 112, and the analytic profile storage 114 may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated embodiment, the active storage 122, the archive storage 108, the process storage 112, and the analytic profile storage 114 are communicatively coupled to the bus 220.

In some embodiments, the active storage 122 may store active data that is likely to be accessed frequently and the archive storage 108 may store the data that is rarely or infrequently accessed. In general, the frequency of access to the data is high when the data is new and reduces over time as the data ages. Therefore, in some embodiments, fresh data recently came in from the application system 118 and/or the process implementing system 120 may first be stored in the active storage 122, and may be moved to the archive storage 108 when the data is no longer consumed frequently.

In some embodiments, the process storage 112 may store batch views and real-time views pre-computed for one or more data analytic requests. When an analytic request is initiated by the user, the smart analytic engine 110 may use those pre-computed views in the process storage 112 to generate a unified analytic result for the request in a timely manner, regardless of the complexity of computation or the amount of computation required.

In some embodiments, the analytic profile storage 114 may store analytic profiles that specify analytic outputs and data attributes to be collected for computing these analytic outputs. In some embodiments, the analytic profile storage 114 may also store the batch views and real-time views of the currently enabled analytic profiles. The data stored in the active storage 122, the archive storage 108, the process storage 112, and the analytic profile storage 114 is described below in more detail.

In some embodiments, the smart analytic engine 110 may include a data ingestion module 202, a process archiving module 204, an archived data managing module 206, a profile enabling module 208, a batch analysis module 210, a real-time analysis module 212, a serving module 214, and a user interface module 216. The components of the smart analytic engine 110 are communicatively coupled via the bus 220. The components of the smart analytic engine 110 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 230. In some embodiments, the components are instructions executable by the processor 230. In some implementations, the components are stored in the memory 232 and are accessible and executable by the processor 230.

The data ingestion module 202 may include software and/or logic to provide the functionality for receiving event data from the application system 118 and the process implementing system 120. In particular, the data ingestion module 202 may have an input coupled to the network 102 to receive event data that the application system 118 or the process implementing system 120 collect or generate for their business processes. The event data associated with different processes may include different data attributes in different formats. For example, a manufacturing system may generate event data associated with its manufacturing processes of various products in various facilities. In this example, the event data may include product ID (e.g., cbe, cbf, cbg, etc.), manufacturing site (e.g., Singapore, Japan, China, etc.), transaction group (e.g., 6600, 6800, etc.), month, year, data elements (e.g., numerical values of manufacturing parameters, etc.), etc. In another example, a patient sensor system may aggregate event data associated with multiple patient sensors. In this example, the event data may include sensor ID, patient ID, date, time of day, data elements (e.g., numerical values of physiological parameters captured by the sensors, etc.), etc. In some embodiments, the data ingestion module 202 may receive the event data at a predefined interval (e.g., every 20 minutes, every hour, every two days, etc.). This interval may be preset, period, random, or based on the amount of data accumulated. In some embodiments, the event data may be continuously streamed in from the application 118 and the process implementing system 120 as the corresponding processes are executed. For example, the data ingestion module 202 may continuously receive clickstreams from a social network system as multiple users interact with the social network. In some embodiments, the data ingestion module 202 may include a cache and may temporarily store the event data before it is provided to the process archiving module 204.

In some embodiments, the data ingestion module 202 may have an output coupled to the process archiving module 204 to send the event data to the process archiving module 204 for additional processing. In some embodiments, data ingestion module 202 may store the event data in the active storage 122.

The process archiving module 204 may include software and/or logic to provide the functionality for processing the incoming data and storing the processed incoming data in the archive storage 108. For example, the process archiving module 204 may receive the event data of a process from the data ingestion module 202, determine one or more data attributes for the process, and archive the process in the archive storage 108 with the determined data attributes. In some embodiments, the process archiving module 204 may receive event data associated with the process and determine process data associated with the process. The process archiving module 204 may generate process metadata from the event data and the process data. The process archiving module 204 may store the event data, the process data, and the process metadata in the data repository 106. In some embodiments, the process archiving module 204 may have an input coupled to the data ingestion module 202 to receive the event data, and an output coupled to the archive storage 108 to facilitate storage.

In some embodiments, the data attributes associated with a process may include data elements and process data. In some embodiments, the data elements may be generated by the process and reflect the performance of the process. In the above examples, the data elements may be the values of manufacturing parameters or the values captured by the patient sensors. In another example, the data elements may be content, comments, number of click-throughs, number of re-shares, number of endorsements, etc. of content items in a social network system. In another example, the data elements may be port number, source and destination IP addresses, size, binary data, etc. of network packets in a network intrusion detection system. Other types of data elements for these systems or other application systems 118 and process implementing systems 120 are possible and contemplated. In some embodiments, the data elements may be extracted from the event data. In particular, the process archiving module 204 may parse the incoming event data to determine the data elements generated by the process.

In some embodiments, the process archiving module 204 may determine process data associated with the process. In some embodiments, the process data may describe the process by providing context information of the process. Accordingly, the process data may be distinct from the data elements. In some embodiments, the process data may be determined from the event data. In some embodiments, the process data may include an arrival timestamp associated with the event data, an application identifier (e.g., application ID) associated with the event data, one or more process parameters and one or more consumption parameters associated with the event data.

In some embodiments, the process archiving module 204 may determine the arrival timestamp associated with the event data. In some embodiments, the arrival timestamp may include the date in complete format (e.g., with year, month, day of month) and/or the time of day that the data ingestion module 202 receives the event data. For example, the process archiving module 204 may determine that the data ingestion module 202 received a set of event data on January 5, 2017 at 1.30 PM. Determining the arrival timestamp associated with the event data as the event data comes in is particularly advantageous in case the temporal information included in the event data by the application system 118 and/or the process implementing system 120 is not complete (e.g., with year and month only), or in case the temporal information is entirely missing from the event data. In some embodiments, the arrival timestamp may be used to organize the data in the archive storage 122. The arrival timestamp may also be used in computing batch views and real-time views as described in further details below.

In some embodiments, the process archiving module 204 may determine application identifier (ID) associated with the event data. The application ID may uniquely identify the application system 118 or the process implementing system 120 that is the source of the event data. For example, the process archiving module 204 may determine that the data ingestion module 202 received a first set of event data on January 5, 2017 at 1.15 PM from a manufacturing system having an application ID of MFG_WD, a second set of event data on January 5, 2017 at 1.30 PM from a social network application having an application ID of SN_Facebook, a third set of event data on January 5, 2017 at 1.45 PM from a social network application having the application ID of SN_LinkedIn, and a fourth set of event data on January 5, 2017 at 2.15 PM from the manufacturing system having the application ID of MFG_WD. In this present disclosure, a particular application system or process implementing system may be referred to by its application ID.

In some embodiments, the process archiving module 204 may store the data associated with each application ID in a separate data bucket in the archive storage 122. In the above example, the first set of event data and the fourth set of event data (together with their process data) may be stored in a first data bucket associated with the application ID of MFG_WD. The second set of event data and the third set of event data (together with their process data) may be stored in a second data bucket associated with the application ID of SN_Facebook and a third data bucket associated with the application ID of SN_LinkedIn, respectively. In some embodiments, the data in each data bucket may be protected using authentication techniques. For example, the user may be required to provide correct username and password in a limited number of attempts in order to get access to or initiate an analytic request against data in a particular data bucket.

In some embodiments, the event data in a data bucket associated with an application ID may come from multiple data sources. For example, the manufacturing system MFG_WD may have three manufacturing sites (e.g., three factories) in Singapore, China, and Japan. Each of these three factories may be considered a data source as the event data may be generated by manufacturing processes executed in each factory. In some embodiments, the event data generated on the shop floor of each factory may be transmitted with the manufacturing site (e.g., Singapore) and the application ID of MFG_WD to the smart analytic engine 110. As described above, in some embodiments, the process archiving module 204 may aggregate the event data from these manufacturing sites into the same data bucket, e.g., the data bucket associated with the application ID of MFG_WD. As a result, data analytics can be performed on the event data collected across multiple manufacturing sites and thereby improving the efficiency of the overall operation of the manufacturing system.

In some embodiments, the process archiving module 204 may store data associated with multiple application systems in the same data bucket in the archive storage 122. In particular, the archive storage 122 may include a combined data bucket that stores data of application systems categorized into the same type of application. For example, the process archiving module 204 may store data (e.g., event data and process data) from the first social network system SN_Facebook, and data from the second social network system SN_LinkedIn in the same data bucket for social network applications (e.g., a combined data bucket associated with the application ID of SN). Similarly, the process archiving module 204 may store the data associated with multiple process implementing systems in the same data bucket in the archive storage 122. In particular, the archive storage 122 may include a combined data bucket for storing data of process implementing systems that execute the same type of process. For example, the archive storage 122 may include a combined data bucket for storing data (e.g., event data and process data) associated with process implementing systems that operate online shopping services. In another example, the archive storage 122 may include a combined data bucket for storing data associated with process implementing systems that manufacture storage devices. This implementation is particularly advantageous in case data analytics need to be performed across multiple application systems 118 and/or process implementing systems 120 in which the business processes are the same, similar, compatible or related. In some embodiments, in order to get access to data in the combined data bucket, the user may need permission to access the data of each application system and/or process implementing system contributed to the combined data bucket.

In some embodiments, the process archiving module 204 may determine process parameters associated with the process from the event data. In particular, the process archiving module 204 may parse the event data to determine process parameters describing the context of the process. Examples of process parameters may include a process identifier (e.g., process ID), a phase identifier (e.g., phase ID), a device ID (e.g., equipment ID, sensor ID, clickstream monitor ID, etc. of the device generating the data elements), temporal coordinates (e.g., date, month, year, time of day when the data elements were generated), spatial coordinates (e.g., X, Y, Z coordinates within the manufacturing site of the sensor(s) generating the data elements), application identifier (e.g., application ID, for example MFG_WD, SN_Facebook, etc.) for a type of application/process (e.g., manufacturing process, social network application, online shopping service, smart home, data center, etc.), a data source (e.g., manufacturing site where the data elements were generated), a frequency of data generation (e.g., how frequently the data elements are generated, for example, every two hours), etc. Other process parameters are also possible and contemplated.

In some embodiments, the process archiving module 204 may determine one or more consumption parameters associated with the event data. In particular, in some embodiments, the process archiving module 204 (or the data ingestion module 202) may store the incoming event data associated with the process in the active storage 122. The process archiving module 204 may monitor the consumption of the event data in the active storage 122 to determine consumption parameters associated with the event data. For example, the process archiving module 204 may determine a frequency of data consumption associated with a set of event data. The frequency of data consumption may indicate the number of times the set of event data has been accessed over a period of time. In some embodiments, the consumption parameters may also include recent consumer identifier(s) (e.g., recent consumer IDs) and frequent consumer identifier(s) (e.g., frequent consumer IDs). The recent consumer ID may identify an entity that accessed the set of event data within the last predetermined period of time (e.g., within the last 3 hours). The frequent consumer ID may identify an entity that accessed the set of event data with a frequency of access satisfying a threshold value. Other consumption parameters are also possible and contemplated.

In some embodiments, the process archiving module 204 may retain the event data with high frequency of data consumption in the active storage 122, and move the event data with low frequency of data consumption from the active storage 122 to the archive storage 108. As discussed elsewhere herein, the active storage 122 may be created from high performance storage devices (e.g., SSDs) and the archive storage 108 may be created from lower performance storage devices (e.g., HDDs). The active storage 122 may therefore allow faster data access than the archive storage 108. In some embodiments, the process archiving module 204 may move the event data from the active storage 122 to the archive storage 108 once the frequency of data consumption associated with the event data satisfies a threshold frequency. As an example, the process archiving module 204 may first store a set of event data streamed in from the manufacturing system MFG_WD in the active storage 122, because the newly generated event data is likely to be accessed frequently for analytics. The process archiving module 204 may keep track of the frequency of data consumption associated with the set of event data. In general, the frequency of data consumption decreases over time as the set of event data ages. When the frequency of data consumption drops to a value that satisfies a frequency threshold (e.g., 3 times per week, 5 times per month, etc.), the process archiving module 204 may migrate the set of event data from the active storage 122 to the archive storage 108 for archiving the corresponding process of the manufacturing system MFG_WD in the archive storage 108.

In some embodiments, the process archiving module 204 may generate the process metadata from the event data and the process data. In some embodiments, the process metadata may be the enhanced data of the data attributes associated with the process. In particular, the process metadata may be the enhanced data of the data elements extracted from the event data or the enhanced data of the process data. In some embodiments, the process metadata may be the enhanced data of the data elements and the process data.

In some embodiments, in order to generate the process metadata, the process archiving module 204 may generate additional data element(s) and/or process parameter(s) from the data elements and the process parameters determined from the event data as described above. For example, assuming that a process parameter (e.g., the temporal coordinates) and a data element (e.g., a total number of products) are missing from a set of event data received from the manufacturing system MFG_WD. In this example, the process archiving module 204 may supplement the process data of the corresponding process with the arrival timestamp of the event data as the temporal coordinates. The process archiving module 204 may also identify the data elements indicating the number of products associated with each product ID, determine the total number of products by computing the sum of these data elements, and include this determined total number of products as a derived data element for the corresponding process.

In some embodiments, the process archiving module 204 may apply a machine learning algorithm to the event data and the process data to generate the process metadata. For example, the process archiving module 204 may generate a statistical learning model describing the timing pattern in which the event data is received from the manufacturing system MFG_WD. The statistical learning model may be generated based on the arrival timestamps of the event data associated with this manufacturing system and may be referred to as arrival timing model. As an example, assuming that a set of event data received from the manufacturing system MFG_WD does not include the frequency of data generation. The process archiving module 204 may derive the frequency of data generation from the arrival timing model associated with the manufacturing system MFG_WD. For example, the arrival timing model may indicate that the average time gap between two consecutive sets of event data received from the manufacturing system MFG_WD is 2.3 hours. The process archiving module 204 may therefore determine that the frequency of data generation associated with the manufacturing system MFG_WD is 2.3 hours and include this inferred frequency of data generation as a derived process parameter for the corresponding process.

In some embodiments, the process archiving module 204 may generate the process metadata by converting, reformatting, or reorganizing data element(s) and/or process parameter(s) associated with the process. For example, the process archiving module 204 may substitute the manufacturing date including only year and month (e.g., January 2017) with the manufacturing date including year, month, day of month in a standard format of YYYYMMDD (e.g., 20170107). The day of month may be determined from the arrival timestamp of the corresponding set of event data. In another example, the process archiving module 204 may determine that a temperature included in a set of event data recently received is in degree Celsius while the temperatures included in the sets of event data previously received from the same data source are in degree Fahrenheit. The process archiving module 204 may automatically convert the temperature extracted from the recent set of event data from degree Celsius to degree Fahrenheit and included the converted temperature as the data element for the corresponding process. Generating the process metadata from the event data and the process data is particularly advantageous because it improves the consistency and completeness of the data attributes determined for processes. In some embodiments, the process metadata may include the data attributes subjected to data enhancement. In some embodiments, the process metadata may include all data attributes (e.g., data elements and process data) determined for the process, including both the data attributes being enhanced and the data attributes that are originally complete, and thus, not being enhanced.

In order to archive a process in the archive storage 108, the process archiving module 204 may store the event data, the process data, and the process metadata associated with the process in the archive storage 108. For example, in some embodiments, the process archiving module 204 may generate a first dataset entry for the process. The first dataset entry may include the event data received by the data ingestion module 202, the process data and the process metadata determined by the process archiving module 204. In particular, the first dataset entry may include the data elements generated by the process and reflecting the performance of the process. The first dataset entry may also include the process data describing the process itself in terms of context information. As described elsewhere herein, the process data may include an arrival timestamp of the event data, an application ID associated with the event data, process parameters extracted from the event data and describing different aspects of the context associated with the process, consumption parameters describing the consumption of the event data when it resides in the active storage 122, etc. In some embodiments, the first dataset entry may also include the process metadata. The process metadata may include the data elements and the process data with one or more data attributes (e.g., data element(s) and/or process parameter(s)) subjected to or generated by data enhancement.

In some embodiments, the process archiving module 204 may receive an archived data model associated with a plurality of second dataset entries in the archive storage 108. The process archiving module 204 may retrieve the archived data model from the archive storage 108 or from the memory 232. In some embodiments, the archived data model may describe the correlation among the second dataset entries archived in the archive storage 108. For example, the archived data model may include a plurality of data points, each data point represents a second dataset entry in the archive storage 108. In some embodiments, the distance between two data points in the archived data model may indicate the similarity between two second dataset entries. For example, the distance between two data points may be directly proportional (or in some embodiments, inversely proportional) to the degree of similarity between two second dataset entries represented by the two data points. In some embodiments, the data points in the archived data model may be grouped into multiple clusters. The second dataset entries associated with data points in the same cluster are likely similar to each other, while the second dataset entries associated with data points in different clusters are likely dissimilar. In some embodiments, the data points in the archived data model may be clustered based on values of the process metadata included in the corresponding second dataset entries.

In some embodiments, the process archiving module 204 may apply the archived data model to the first dataset entry of the process to be archived to determine the relationship between the first dataset entry and the second dataset entries in the archive storage 108. In some embodiments, the process archiving module 204 may store the first dataset entry of the process in the archive storage 108 based on the relationship between the first dataset entry and the second dataset entries. For example, the process archiving module 204 may identify a cluster of second dataset entries for the first dataset entry using a cluster algorithm. In particular, the process archiving module 204 may assign the first dataset entry to a cluster of second dataset entries to which the first dataset entry is most similar. The first dataset entry may be placed into a cluster that minimizes its distance to neighbor data points within the cluster, and thus maximizes its degree of similarity to other second dataset entries of the cluster. In some embodiments, the first dataset entry may be clustered based on the process metadata. For example, the first dataset entry may be clustered based on the values of its process parameters (e.g., product ID, manufacturing site, the enhanced temporal coordinates, etc.). In another example, the first dataset entry may be clustered based on the values of its data elements. The process archiving module 204 may use any machine learning technique for clustering the first dataset entry, e.g., K-means clustering algorithm, two-step clustering algorithm, etc. Other clustering methods are also possible and contemplated.

In some embodiments, the second dataset entries that are classified into the same cluster of the archived data model may be stored together in the same dataset. Each dataset may be stored in a separate data file or in a separate folder of the archive storage 108. In some embodiments, the process archiving module 204 may identify the dataset associated with the cluster of second dataset entries to which the first dataset entry belongs. The process archiving module 204 may then update the identified dataset to include the first dataset entry. Accordingly, the first dataset entry may be stored together with the second dataset entries similar to it, e.g., the second dataset entries that share common value of one or more process parameters with the first dataset entry. By virtue of determining process data prior to storing the dataset entry associated with the process in the archive storage 108, and clustering the dataset entries in the archive storage 108 based on the process parameters, the dataset entries archived in the archive storage 108 are advantageously organized for query prior to data analytics. This implementation is particularly advantageous because it eliminates the need to extract process data and gather the data needed during analytic computation. Therefore, the processing time to generate analytic results can be significantly reduced, especially in case a massive amount of archived data is subjected to analytic processing. Additionally, as the process data is determined prior to archiving the process, the data included in the dataset entries for the process can be enhanced. As described elsewhere herein, the dataset entries of the process may include process metadata, and the process metadata may include one or more data attributes (e.g., process parameters and/or data elements) subjected to or generated by data enhancement.

In some embodiments, the process archiving module 204 may have an output coupled to the archive storage 108 to store the first dataset entry of the process in the archive storage 108, and more particularly, in the dataset associated with the cluster of second dataset entries to which the first dataset entry belongs in the archive storage 108. In some embodiments, the process archiving module 204 may send the first dataset entry to the batch analysis module 210 and/or the real-time analysis module 212.

The archived data managing module 206 may include software and/or logic to provide the functionality for dynamically and adaptively managing the dataset entries archived in the archive storage 108. For example, the archived data managing module 206 may monitor the consuming patterns associated with the second dataset entries in the archive storage 108 and reorganize the structure under which the second dataset entries are stored in the archive storage 108 accordingly. The consuming patterns may indicate the pattern in which the second dataset entries is accessed or queried.

In some embodiments, the archived data managing module 206 may monitor and determine the consuming pattern associated with each data bucket. As an example, the archived data managing module 206 may determine that the second dataset entries in the data bucket associated with the application ID of MFG_WD (also referred to herein as the data bucket of MFG_WD) are often requested based on values of one or more process parameters. For example, the archived data managing module 206 may determine that at the time $t=t_1$, the data queries against the second dataset entries in the data bucket of MFG_WD constantly use manufacturing site and product ID as filtering factors. The archived data managing module 206 may later on determine that at the time $t=t_2$, the second dataset entries are now often retrieved based on its values of manufacturing site, transaction group, and manufacturing date. As illustrated in this example, the consuming pattern of the archived dataset entries may dynamically change over time, e.g., because the consuming entities may subsequently be interested in different analytic outputs.

In some embodiments, the archived data managing module 206 may determine one or more process parameters based on the consuming pattern. The archived data managing module 206 may use these determined process parameters as clustering factors to cluster the second dataset entries in the archive storage 108. In the above example, at the time $t=t_1$, the archived data managing module 206 may determine that the process parameters for clustering the second dataset entries are manufacturing site and product ID. At the time $t=t_2$, the archived data managing module 206 may determine that process parameters for clustering the second dataset entries are manufacturing site, transaction group, and manufacturing date.

In some embodiments, the archived data managing module 206 may cluster the second dataset entries in the archive storage 108 based on the determined process parameters to generate the archived data model. For example, at the time $t=t_1$, the archived data managing module 206 may generate the archived data model by clustering the second dataset entries based on the manufacturing site and product ID. As discussed elsewhere herein, the archived data model may describe how the second dataset entries are related to each other and may include one or more clusters of second dataset entries. The second dataset entries belonging to the same cluster are likely similar to each other while the second dataset entries classified into different clusters are likely dissimilar. For example, at the time $t=t_1$, the archived data managing module 206 may group the second dataset entries with the manufacturing site of Singapore into a first cluster, the second dataset entries with the manufacturing site of Japan into a second cluster, and the second dataset entries with the manufacturing site of China into a third cluster. In this example, the second dataset entries within each cluster at the first level (e.g., the clusters generated based on manufacturing site) may be grouped into clusters at a second level based on product ID. In particular, the first cluster of second dataset entries with the manufacturing site of Singapore may include a cluster of second dataset entries with the product ID of "cbf," and a cluster of second dataset entries with the product ID of "cbg" at the second level. In some embodiments, the clustering of second dataset entries may continue at additional level(s) based on other process parameters determined from the consuming pattern. In a similar way, the archived data managing module 206 may cluster the second dataset entries based on manufacturing site, transaction group, and manufacturing date at the time $t=t_2$. As a result, the archived data model describing the second dataset entries in the archive storage 108 generated at the time $t=t_2$ may be structured differently from the archived data model generated at the time $t=t_1$, depending on the process parameters derived from the consuming pattern to be used for clustering.

In some embodiments, the archived data managing module 206 may aggregate each cluster of second dataset entries in the archived data model into a dataset, and each aggregated dataset may be stored in a separate storage location within the archive storage 108 in order to facilitate retrieval. For example, each dataset associated with each cluster of second dataset entries may be stored in a separate data file or a separate folder in the archive storage 108. In some embodiments, the archived data managing module 206 may organize the folders based on the archived data model. Therefore, the hierarchy of the folders may resemble the structure of the archived data model.

As an example, assuming that the second dataset entries associated with the manufacturing system MFG_WD are clustered based on manufacturing site (e.g., Singapore, Japan, China), product ID (e.g., cbf, cbg), transaction group (e.g., 6800, 6600), and manufacturing date (e.g., 01/06/2017 and 01/07/2017) in the archived data model. Under the data bucket of MFG_WD in the archive storage 108 (e.g., primary folder "MFG_WD"), the archived data managing module 206 may create a plurality of subfolders and structure the created subfolders based on the archived data model.

In particular, the archived data managing module 206 may create three first-level folders associated with the manufacturing site of Singapore, Japan, and China (e.g., folders \MFG_WD\site=SGP, \MFG_WD\site=JP, and \MFG_WD\site=CN). The second dataset entries with manufacturing site of Singapore, Japan, and China may be stored in the first-level folder "\MFG_WD\site=SGP," "\MFG_WD\site=JP," and "MFG_WD\site=CN," respectively. As illustrated in this example, in some embodiments, the archived data managing module 206 may assign to a folder a folder name (or an index) that indicates a process parameter (e.g., "site") and a value of that process parameter (e.g., "SGP") which the second dataset entries stored in the folder have in common. In this present disclosure, a dataset entry is considered being stored in a folder if the dataset entry can be retrieved directly from the folder or indirectly from a subfolder included in the folder.

Continuing the above example, within each first-level folder, the archived data managing module 206 may create two second-level folders associated with the product ID of "cbf" and "cbg." For example, the first-level folder "\MFG_WD\site=SGP" may include two second-level folders as follows:

\MFG_WD\site=SGP\product=cbf; and
\MFG_WD\site=SGP\product=cbg.

The second dataset entries with the manufacturing site of Singapore and the product ID of "cbf" may be stored in the second-level folder "\MFG_WD\site=SGP\product=cbf." The second dataset entries with the manufacturing site of Singapore and the product ID of "cbg" may be stored in the second-level folder "\MFG_WD\site=SGP\product=cbg."

Continuing the above example, within each second-level folder, the archived data managing module 206 may create two third-level folders associated with the transaction group of "6600" and "6800." For example, the second-level folder "MFG_WD\site=SGP\product=cbf" may include two third-level folders as follows:

\MFG_WD\site=SGP\product=cbf\trxgroup=6600; and
\MFG_WD\site=SGP\product=cbf\trxgroup=6800.

The second dataset entries with the manufacturing site of Singapore, the product ID of "cbf," and the transaction group of "6600" may be stored in the third-level folder "\MFG_WD\site=SGP\product=cbf\trxgroup=6600." The second dataset entries with the manufacturing site of Singapore, the product ID of "cbf," and the transaction group of "6800" may be stored in the third-level folder "MFG_WD\site=SGP\product=cbf\trxgroup=6800."

Continuing the above example, within each third-level folder, the archived data managing module 206 may create two fourth-level folders associated with the manufacturing date of January 6, 2017 and January 7, 2017. For example, the third-level folder "\MFG_WD\site=SGP\product=cbf\trxgroup=6600" may include two fourth-level folders as follows:

\MFG_WD\site=SGP\product=cbf\trxgroup=6600\
  date=20170106; and
\MFG_WD\site=SGP\product=cbf\trxgroup=6600\
  date=20170107.

The second dataset entries with the manufacturing site of Singapore, the product ID of "cbf," the transaction group of "6600," and the manufacturing date of January 6, 2017 may be stored in the fourth-level folder "\MFG_WD\site=SGP\product=cbf\trxgroup=6600\date=20170106." The second dataset entries with the manufacturing site of Singapore, the product ID of "cbf," the transaction group of "6600," and the manufacturing date of January 7, 2017 may be stored in the fourth-level folder "\MFG_WD\site=SGP\product=cbf\trxgroup=6600\date=20170107."

As illustrated in this example, the data bucket of "MFG_WD" may include four layers of folders corresponding to four process parameters used for clustering the second dataset entries (e.g., manufacturing site, product ID, transaction group, and manufacturing date), and the second dataset entries may be optimally stored within the archive storage 108 in these folders. In particular, the second dataset entries associated with similar process data (e.g., the second dataset entries that have the same values of one or more process parameters) may be stored together in the folder indexed with the one or more process parameters and the corresponding values. This implementation is particularly advantageous because it simplifies the tasks of identifying appropriate set of second dataset entries for query execution. For example, in order to compute a Key Performance Indicator (KPI) metric (e.g., total number of detected defects) for manufacturing processes of product "cbg" at the manufacturing site of Singapore, the analytic modules may retrieve the second dataset entries stored in the folder "\MFG_WD\site=SGP\product=cbg." In order to compute the total number of detected defects for manufacturing process of product "cbg" at the manufacturing site of Singapore on January 7, 2017 (e.g., to evaluate a technical solution for detecting certain defects first deployed in production line of product "cbg" in Singapore factory on that particular day), the analytic modules may retrieve the second dataset entries stored in two folders:

\MFG_WD\site=SGP\product=cbg\trxgroup=6600\
  date=20170107; and
\MFG_WD\site=SGP\product=cbg\trxgroup=6800\
  date=20170107.

Because the second dataset entries are advantageously organized based on process parameters in the archive storage 108, the analytic modules can quickly identify and retrieve the second dataset entries against which the analytic request is applied. This eliminates the need to parse a massive amount of event data to determine process parameters during data analytics, followed by identifying the relevant event data to apply the analytic request based on the extracted process parameters. As a result, the query processing time can be substantially reduced. In addition, this implementation is particularly advantageous because the folder structure under which the second dataset entries being stored in the archive storage 108 is dynamically adapted to the consuming pattern. As the consuming pattern associated with the second dataset entries changes over time, the second dataset entries may be re-clustered based on process parameters determined from the new consuming pattern, resulting in an updated archived data model and thus, an updated folder structure to re-organize the second dataset entries accordingly. By virtue of organizing the second dataset entries in the archive storage based on the way they are likely requested, the query efficiency (e.g., the response time, etc.) can be improved. It should be understood that in addition to process parameters, other data attributes (e.g., data elements, arrival timestamp, etc.) in the event data, the process data, and the process metadata may be determined from the consuming pattern to be used as clustering factors for generating the archived data model associated with the second dataset entries.

In some embodiments, the archived data managing module 206 may store the consuming pattern and/or the data factors used for clustering (e.g., process parameters determined from the consuming pattern) in the archive storage 108 or the memory 232. In some embodiments, the archived data managing module 206 may store the archived data model in the archive storage 108 or the memory 232. In some embodiments, the archived data managing module 206 may be coupled to the archive storage 108 to manage the second dataset entries in the archive storage 108.

Once the business processes are advantageously archived in the archive storage 108 with the corresponding event data and process data as described above, the archived data associated with the processes can be analyzed to gain comprehensive insights into the processes and thereby improving them accordingly. Generating analytic results from a massive amount of archived data can be a challenge because data processing can take a long time while the analytic results are often expected to be delivered responsively. This problem is solved by computing the analytic results in advance (e.g., prior to the analytic request being initiated by the requesting user 116) and making these pre-computed results (also referred to as pre-computed views) ready in databases for query. In some embodiments, the pre-computed views may include one or more batch views stored in the batch serving database and one or more real-time views stored in the real-time serving database in the process storage 112.

In some embodiments, an analytic result (also referred to herein as analytic output) may be a metric (e.g., a numeric value) for evaluating an aspect of performance associated with a process, a process model describing the correlations between data components archived for the process, a pattern or an anomaly detected in the archived data associated with the process, etc. Other types of analytic outputs are also possible and contemplated. In some embodiments, a set of analytic outputs may be grouped together in an analytic profile. The analytic profile may specify one or more analytic outputs, data attributes (e.g., data elements and/or process parameters) needed for computing the analytic outputs, and algorithms (e.g., mathematical equations, learning models, statistical methods, etc.) to compute the analytic outputs from the data attributes, etc. In some embodiments, the batch view(s) and/or real-time view(s) may be pre-computed for each analytic output in the analytic profile and may be stored with matching indexes in the batch serving database and the real-time serving database. Therefore, the ultimate result for an analytic request can be generated and delivered to the requesting user 116 in a timely manner (e.g., in real-time or near real-time, hourly instead of daily) using the corresponding batch views and real-time views, regardless of what analytic output of the analytic profile is requested in the analytic request at a certain time.

In some embodiments, the batch view(s) may be generated by the batch analysis module 210 and the real-time view(s) may be generated by the real-time analysis module 212. The batch analysis module 210 and the real-time analysis module 212 may be communicatively coupled to the archive storage 108 to access the second dataset entries in the archive storage 108 and use the second dataset entries to pre-compute the batch view(s) and the real-time view(s), respectively. As discussed in details below, at the time the requesting user 116 initiates the analytic request, the serving module 214 may retrieve these pre-computed batch view(s) and real-time view(s) (e.g., from the batch serving database and the real-time serving database) and combine them to generate a unified result. The unified result may be provided to the requesting user 116 as an ultimate analytic result in response to the analytic request. In some embodiments, the batch analysis module 210, the real-time analysis module 212, and the serving module 214 may be considered as examples of analytic modules.

The batch analysis module 210 may include software and/or logic to provide the functionality for performing batch analytics. In particular, the batch analysis module 210 may receive dataset entries from the archive storage 108 or the process archiving module 204. The batch analysis module 210 may pre-compute the batch views associated with one or more analytic outputs potentially requested by users in their analytic requests using the dataset entries, and store the pre-computed batch views in the batch serving database in the process storage 112.

In some embodiments, the batch analysis module 210 may determine one or more analytic datasets in the archive storage 108 based on the analytic request for which the batch view is pre-computed. In some embodiments, the analytic dataset may be a set of second dataset entries in a folder of the archive storage 108 that are needed to calculate the analytic output specified in the analytic request. Continuing the above example of manufacturing system MFG_WD, assuming that a first analytic request served by the smart analytic engine 110 is to compute the total number of detected defects associated with product "cbg" and transaction group "6800." For this analytic request, the batch analysis module 210 may determine that the analytic datasets include the second dataset entries in the folders associated with a product ID of "cbg" and the transaction group of "6800." In particular, the analytic datasets for computing the total number of detected defects associated with product "cbg" and transaction group "6800" may include the second dataset entries in the following folders of the archive storage 108:

\MFG_WD\site=SGP\product=cbg\trxgroup=6800;
\MFG_WD\site=JP\product=cbg\trxgroup=6800; and
\MFG_WD\site=CN\product=cbg\trxgroup=6800.

As another example, assuming that a second analytic request served by the smart analytic engine 110 is to compute the total number of detected defects associated with each manufacturing site for a given day (e.g., January 6, 2017). For this analytic request, the batch analysis module 210 may determine that the analytic datasets include the second dataset entries in the folders associated with a particular manufacturing site and the manufacturing date of January 6, 2017. For example, the first analytic datasets for computing the total number of detected defects in manufacturing site of Singapore on January 6, 2017 may include the second dataset entries in the following folders of the archive storage 108:

\MFG_WD\site=SGP\product=cbf\trxgroup=6600\
    date=20170106;
\MFG_WD\site=SGP\product=cbf\trxgroup=6800\
    date=20170106;
\MFG_WD\site=SGP\product=cbg\trxgroup=6600\
    date=20170106; and
\MFG_WD\site=SGP\product=cbg\trxgroup=6800\
    date=20170106.

The second analytic datasets for computing the total number of detected defects in manufacturing site of Japan on January 6, 2017 may include the second dataset entries in the following folders of the archive storage 108:

\MFG_WD\site=JP\product=cbf\trxgroup=6600\
    date=20170106;
\MFG_WD\site=JP\product=cbf\trxgroup=6800\
    date=20170106;
\MFG_WD\site=JP\product=cbg\trxgroup=6600\
    date=20170106; and
\MFG_WD\site=JP\product=cbg\trxgroup=6800\
    date=20170106.

The third analytic datasets for computing the total number of detected defects in manufacturing site of China on January 6, 2017 may include the second dataset entries in the following folders of the archive storage 108:

\MFG_WD\site=CN\product=cbf\trxgroup=6600\
    date=20170106;
\MFG_WD\site=CN\product=cbf\trxgroup=6800\
    date=20170106;
\MFG_WD\site=CN\product=cbg\trxgroup=6600\
    date=20170106; and
\MFG_WD\site=CN\product=cbg\trxgroup=6800\
    date=20170106.

As illustrated in the above examples, because the archived dataset entries (e.g., the second dataset entries) are advantageously organized within the archive storage 108 based on the process parameters, the second dataset entries needed to calculate an analytic output can be quickly identified. This implementation avoids the situation where the raw event data needs to be parsed during data analytics to extract the process parameters, and only then the event data to be analyzed can be selected based on the process parameters. With the massive amount of event data being archived and analyzed on a regular basis, this implementation can substantially reduce the amount of processing time and the amount of computing resources required.

In some embodiments, the batch analysis module 210 may retrieve the second dataset entries included in the determined analytic dataset(s) from the archive storage 108. In some embodiments, the batch analysis module 210 may compute an analytic result for the analytic request using these second dataset entries to generate a first batch view. Continuing the above example with the first analytic request, the batch analysis module 210 may retrieve the second dataset entries from the following folders of the archive storage 108:

\MFG_WD\site=SGP\product=cbg\trxgroup=6800;
\MFG_WD\site=JP\product=cbg\trxgroup=6800; and
\MFG_WD\site=CN\product=cbg\trxgroup=6800.

The batch analysis module 210 may compute the total number of detected defects associated with product "cbg" and transaction group "6800" using data elements (e.g., the defects detected in each test, etc.) and process parameters (e.g., test ID, temporal coordinates such as date, month, year, time of day, etc.) in the second dataset entries retrieved. The batch analysis module 210 may store the generated total number of detected defects in the batch serving database as the first batch view pre-computed for the analytic output of "total number of detected defects" associated with product "cbg" and transaction group "6800."

In some embodiments, the analytic datasets for computing the batch views may include all second dataset entries available in the corresponding folders, e.g., all second dataset entries that have been archived in the corresponding folders up to the point when the batch processing begins. Due to the large volume of data being processed, the batch processing often takes a long time (e.g., a number of hours) from start to finish. As a result, even a newly generated batch view may already be out-of-date because the process keeps running and generating additional event data while the batch processing is in progress. The additional event data therefore will not be reflected in the batch view generated at the end of the batch processing. In some embodiments, the batch analysis module 210 may perform the batch analytics continuously. For example, the batch analysis module 210 may start a second batch processing (also referred to herein as batch cycle) when a first batch processing completes. In other embodiments, the batch analysis module 210 may start the batch cycles at predetermined interval, e.g., every 4 hours, every 10 hours, every 24 hours, etc.

In some embodiments, each batch view may be associated with a batch processing timestamp. The batch processing timestamp may identify the latest second dataset entry being processed to generate the batch view. In some embodiments, the batch processing timestamp of a batch view may be determined as the arrival timestamp of the latest second dataset entry in the analytic dataset(s) from which the batch view is generated. Continuing the above example with the first analytic request, assuming that when the batch cycle starts, the analytic dataset used to pre-compute the total number of detected defects associated with product "cbg" and transaction group "6800" includes 15,000 second dataset entries in three folders:

Folder A: \MFG_WD\site=SGP\product=cbg\trx-group=6800;
Folder B: \MFG_WD\site=JP\product=cbg\trx-group=6800; and
Folder C: \MFG_WD\site=CN\product=cbg\trx-group=6800.

The batch analysis module 210 may then determine that the latest second dataset entry in these 15,000 second dataset entries arrived on January 7, 2017 at 9.15 AM. The batch analysis module 210 may then determine that the batch processing timestamp of the batch view generated in that batch cycle is January 7, 2017: 9.15 AM. In other embodiments, the batch analysis module 210 may rely on dataset entry ID (e.g., assuming that the dataset entry ID is incremental) or archival timestamp (e.g., the timestamp indicating when the second dataset entry is archived in the archive storage 108) to identify the latest second dataset entry subjected to batch analytics.

As described above, the batch analysis module 210 may re-compute each batch view entirely (e.g., from all second dataset entries that exist in the archive storage 108 when the batch cycle starts) without relying on the previously computed batch views. Although this computing approach may not be efficient, the computing errors are not accumulated through multiple batch cycles, and thus, error propagation can be avoided. This approach helps make the smart analytic engine 110 fault tolerant to human errors. In these embodiments, the batch analysis module 210 may discard the batch view computed in the first batch cycle when the batch view computed in the second batch cycle is available (the second batch cycle occurs subsequent to the first batch cycle). For example, the batch analysis module 210 may replace the batch view generated in the first batch cycle and currently stored in the batch serving database with the first batch view generated in the second batch cycle. In other embodiments, the batch analysis module 210 may retain a predetermined number of batch views in the batch serving database. For example, the batch analysis module 210 may keep three batch views generated most recently in the batch serving database for each analytic output.

In some embodiment, the batch analysis module 210 may store the batch views computed for each analytic output potentially requested by the requesting user 116 in the batch serving database in the process storage 112. In some embodiments, the batch analysis module 210 may temporarily store the generated batch views in a cache during peak hours of system operation. The batch analysis module 210 may retrieve the generated batch views from the cache and store them in the batch serving database in the process storage 112 at a later point (e.g., during off-peak hours) to avoid potential impact on query execution time. In some embodiments, the cache for temporarily storing the generated batch views may reside on high performance storage device(s) (e.g., SSDs) to enable fast write operation. The cache may be included in the batch analysis module 210, the processor 230, or the memory 232. In some embodiments, the batch views stored in the cache may be replaced by or updated with newly generated batch views when they are available. In some embodiments, the batch analysis module 210 may send the batch processing timestamp to the real-time analysis module for determining the second dataset entries subjected to real-time analysis. In other embodiments, the batch analysis module 210 may store the batch processing timestamp in the memory 232.

The real-time analysis module 212 may include software and/or logic to provide the functionality for performing real-time analysis. In particular, the real-time analysis module 212 may receive dataset entries from the archive storage 108 or the process archiving module 204. The real-time analysis module 212 may pre-compute the real-time views associated with one or more analytic outputs potentially requested by users in their analytic requests using the dataset entries, and store the pre-computed real-time views in the real-time serving database in the process storage 112.

As discussed above, because a batch cycle may take a long time to complete, the event data of the process coming in after the batch cycle starts may not be included in the batch computation. In some embodiments, the event data that is not yet captured in the batch view may be included in one or more real-time view(s) so that an ultimate result that reflects the entire collection of event data relevant to the analytic request can be created and provided to the requesting user 116 at any time, regardless of the progress of the batch cycle. In some embodiments, a real-time view may be computed from the recent dataset entries. The recent dataset entries may be the second dataset entries in the archive storage 108 that are not reflected in batch view(s) and not reflected in previously computed real-time view(s). In some embodiments, each real-time view may be associated with a processing timestamp. The processing timestamp of a real-time view may identify the latest second dataset entry being processed to generate the real-time view. In some embodiments, the processing timestamp of a real-time view may be determined as the arrival timestamp of the latest second dataset entry in the analytic dataset(s) from which the real-time view is generated. In other embodiments, the real-time analysis module 212 may rely on dataset entry ID or archival timestamp to identify the latest second dataset entry subjected to real-time analytics. In some embodiments, the real-time analysis module 212 may manage the real-time views in the real-time serving database based on the processing timestamps of the real-time views and the batch processing timestamp received from the batch analysis module 210.

In some embodiments, the real-time analysis module 212 may determine analytic dataset(s) in the archive storage 108 based on the analytic request for which the real-time view is pre-computed. In some embodiments, the real-time analysis module 212 may determine recent dataset entries included in the determined analytic dataset(s), e.g., based on a threshold timestamp. In some embodiments, the threshold timestamp may be the latest processing timestamp among the processing timestamps of the real-time views stored in a real-time serving database. The real-time analysis module 212 may identify the second dataset entries that arrived subsequent to the threshold timestamp as the recent dataset entries to be used for computing the real-time view. The real-time analysis module 212 may then update the threshold timestamp to be the arrival timestamp of the latest dataset entry in the identified recent dataset entries. In some embodiments, a new real-time view may be generated when the analytic request is initiated by the requesting user 116 and there is event data in the archive storage 108 not yet captured in the batch view and previously computed real-time view(s). In other embodiments, the real-time views may be computed at a predetermined interval (e.g., every 15 minutes).

Continuing the above example with the first analytic request, assuming that the requesting user 116 initiates an analytic request of total number of detected defects associated with product "cbg" and transaction group "6800" on January 7, 2017 at 10.30 AM. At that time, the batch serving database stores a first batch view computed in previous batch cycle, e.g., the batch view associated with the batch processing timestamp of January 7, 2017: 7.15 AM (the latest second dataset entries captured in the first batch view arrived on January 7, 2017 at 7.15 AM). The batch analysis module 210 is in progress of computing a second batch view associated with the batch processing timestamp of January 7, 2017: 9.15 AM (the latest second dataset entries captured in the first batch view arrived on January 7, 2017 at 9.15 AM). The second batch view is therefore not yet available in the batch serving database, and thus, the first batch view is used to compute the analytic result to be provided to the requesting user 116. In this example, assuming that a real-time serving database stores four real-time views with the corresponding processing timestamp as follows:

Real-time view 1: January 7, 2017: 8.00 AM
Real-time view 2: January 7, 2017: 8.45 AM
Real-time view 3: January 7, 2017: 9.30 AM
Real-time view 4: January 7, 2017: 9.45 AM As illustrated in this example, the second dataset entries that are not yet included in batch computation of the first batch view but arrived prior to the processing timestamp of the real-time view 4 (the latest real-time processing timestamp among four processing timestamps) are already reflected in the above four real-time views. Therefore, the real-time analysis module 212 may compute a real-time view 5 that captures the second dataset entries arrived after the processing timestamp of the real-time view 4. Accordingly, the real-time analysis module 212 may determine the processing timestamp of the real-time view 4 (January 7, 2017: 9.45 AM) as the threshold timestamp. The real-time analysis module 212 may identify the second dataset entries in the analytic datasets (e.g., the second dataset entries in Folder A, Folder B, Folder C) that have an arrival timestamp subsequent to the threshold timestamp to be the recent dataset entries. In this example, assuming that there are 20 recent dataset entries being identified and the latest dataset entry in these 20 recent dataset entries has the arrival timestamp of January 7, 2017: 10.25 AM. The real-time analysis module 212 may then update the threshold timestamp to be January 7, 2017: 10.25 AM.

In some embodiments, the real-time analysis module 212 may retrieve the existing real-time views from the real-time serving database. In the above example, the real-time analysis module 212 may receive the real-time view 1, the real-time view 2, the real-time view 3, and the real-time view 4 from the real-time serving database. In some embodiments, the real-time analysis module 212 may compute an analytic result for the analytic request using the recent dataset entries and the existing real-time views to generate a first real-time view based on incremental computation. With the incremental computing approach in which the difference compared to the existing real-time view(s) is processed, the first real-time view can be generated a lot faster than performing an entire recalculation from scratch as carried out by the batch analysis module 210. In the above example, the real-time analysis module 212 may compute the real-time view 5 using the 20 recent dataset entries identified and the four existing real-time views. For example, the real-time analysis module 212 may compute the total number of detected defects in the real-time view 5 by adding the number of detected defects included in data elements of the 20 recent dataset entries to the total number of detected defects in the real-time view 4. The algorithm to perform incremental computation on the recent dataset entries and the existing real-time views may be specific to the analytic output for which the real-time view is pre-computed. In some embodiments, the real-time analysis module 212 may update the real-time serving database to include the generated first real-time view (e.g., the real-time view 5). The real-time view 5 may be assigned a processing timestamp of January 7, 2017: 10.25 AM, based on the arrival timestamp of the latest dataset entry in the 20 recent dataset entries captured by the real-time view 5.

In some embodiments, the real-time analysis module 212 may remove one or more real-time views that are now reflected in batch view from the real-time serving database. In particular, the real-time analysis module 212 may receive a batch processing timestamp associated with a batch view from the batch analysis module 210, e.g., when a batch cycle is completed and the newly generated batch view is ready for use in the batch serving database. The real-time analysis module 212 may determine one or more real-time views having processing timestamps prior to the batch processing timestamp and remove these real-time views from the real-time serving database. For example, assuming that the batch analysis module 210 completes the batch computation of the second batch view on January 7, 2017 at 11 AM. The batch analysis module 210 may send the batch processing timestamp of the second batch view (January 7, 2017: 9.15 AM) to the real-time analysis module 212. The real-time analysis module 212 may determine that the real-time view 1 and the real-time view 2 have the processing timestamps (January 7, 2017: 8.00 AM and January 7, 2017: 8.45 AM, respectively) prior to the batch processing timestamp of the second batch view, and thus, the event data covered in the real-time view 1 and the real-time view 2 is now taken into account in the second batch view. As a result, the real-time view 1 and the real-time view 2 are no longer needed and may be removed from the real-time serving database. On the other hand, the real-time view 3 and the real-time view 4 have the processing timestamps (January 7, 2017: 9.30 AM and January 7, 2017: 9.45 AM, respectively) subsequent to the batch processing timestamp of the second batch view, and thus, the event data covered in the real-time view 3 and the real-time view 4 is not yet included in the batch computation. As a result, the real-time view 3 and the real-time view 4 may be retained in the real-time serving database, and may be used together with the second batch view to compute the ultimate analytic result, in case the requesting user 116 initiates the corresponding analytic request.

In some embodiment, the real-time analysis module 212 may store the real-time views computed for each analytic output potentially requested by the requesting user 116 in the real-time serving database in the process storage 112. In some embodiments, the real-time analysis module 212 may temporarily store the generated real-time views in a cache during peak hours of system operation. The real-time analysis module 212 may retrieve the generated real-time views from the cache and store them in the real-time serving database in the process storage 112 at a later point (e.g., during off-peak hours) to avoid potential impact on query execution time. In some embodiments, the cache for temporarily storing the generated real-time views may reside on high performance storage device(s) (e.g., SSDs) to enable fast write operation. The cache may be included in the real-time analysis module 212, the processor 230, or the memory 232. In some embodiments, the batch views and the real-time views may be temporarily stored in the same cache. In some embodiments, the real-time views stored in the cache may be updated with newly generated real-time views when they are available. In some embodiments, the real-time analysis module 212 may store the threshold timestamp in the real-time serving database. In other embodiments, the real-time analysis module 212 may store the threshold timestamp in the memory 232.

The serving module 214 may include software and/or logic to provide the functionality for generating a unified view to be provided to the requesting user 116 from a batch view and one or more real-time views. In particular, the serving module 214 may receive a batch view from the batch serving database and one or more real-time views from the real-time serving database in the process storage 112. The serving module 214 may combine the batch view and the one or more real-time views to generate a unified view for the analytic request.

In some embodiments, the serving module 214 may receive an analytic request initiated by the user from the user interface module 216. For example, the serving module 214 may receive from the user interface module 216 an analytic request requesting a total number of detected defects associated with product "cbg" and transaction group "6800" initiated by the user on January 7, 2017 at 10.30 AM. The serving module 214 may receive a batch view pre-computed for the analytic output of total number of detected defects associated with product "cbg" and transaction group "6800" from the batch serving database, and the corresponding real-time views from the real-time serving database. In particular, the serving module 217 may receive the first batch view from the batch serving database and the real-time view 1, the real-time view 2, the real-time view 3, the real-time view 4, the real-time view 5 from the real-time serving database. As illustrated in this example, the first batch view is the total number of detected defects generated from the second dataset entries that arrived prior to its batch processing timestamp of January 7, 2017: 7.15 AM. The second dataset entries arrived afterwards and up to the point where the analytic request is initiated by the requesting user 116 are covered in the five real-time views.

In some embodiments, the serving module 214 may incorporate the batch view and the real-time view(s) to generate a unified view. The unified view may be provided to the requesting user 116 as the ultimate analytic result for the analytic request. The algorithm to combine the batch view and the real-time view(s) may be specific to the analytic output requested by the requesting user 116. In the above example, the serving module 214 may determine that the first batch view is the total number of detected defects up to its batch processing timestamp of January 7, 2017: 7.15 AM, and that the real-time view 5 is the total number of detected defects generated from data elements of all recent dataset entries that are not covered by the first batch view. The serving module 214 may then calculate the sum of the total number of detected defects in the first batch view and the total number of detected defects in the real-time view 5 as the unified result for the analytic request of total number of detected defects. In another example, assuming that the requesting user 116 requests the analytic output of minimum mean error rate. The serving module 214 may compare the mean error rate pre-computed in the batch view with the mean error rate(s) precomputed in the real-time view(s). Based on the comparison, the serving module 214 may select the lowest mean error rate as the unified result for the analytic request of minimum mean error rate.

In some embodiments, the serving module 214 may send the unified result to the user interface module 216 to generate a graphical interface for displaying the unified result to the requesting user 116. In some embodiments, the serving module 214 may store the unified result in the memory 232.

The user interface module 216 may include software and/or logic to provide the functionality for generating and providing user interfaces to the user 116. In some embodiments, the user interface module 216 may generate a user interface for the requesting user 116 to initiate an analytic request. For example, the requesting user 116 may input various variables for the analytic request (e.g., analytic output="total number of detected defects," product="cbg," transaction group="6800," etc.) via the user interface. The user interface module 216 may send a signal indicating the analytic request initiated by the requesting user 116 to the serving module 214 to generate the corresponding unified result.

In some embodiments, the user interface module 216 may generate a user interface for the requesting user 116 to enable or disable an analytic profile. For example, a user 116 authenticated to access data associated with an application system 118 or a process implementing system 120 may enable or disable one or more analytic profiles associated with the data bucket of such system. The user interface module 216 may receive the selection of the analytic profiles to be enabled/disabled for a particular data bucket from the requesting user 116 via the user interface, and send a signal indicating these user inputs for enabling or disabling the analytic profiles (e.g., profile ID, application ID, option selected: enable or disable) to the profile enabling module 208.

In some embodiments, the user interface module 216 may generate a user interface for displaying the ultimate results (e.g., the unified views) of the analytic requests. In the above example, in response to the first analytic request, the user interface module 216 may generate a user interface including a numerical value of the total number of detected defects associated with product "cbg" and transaction group "6800." In response to the second analytic request, the user interface module 216 may generate a user interface including numerical values of the total number of detected defects associated with each manufacturing site on January 6, 2017. In some embodiments, the ultimate results for the analytic request may be represented with visual dashboard. For example, the user interface module 216 may generate a line graph showing the total number of detected defects associated with product "cbg" and transaction group "6800" over time. In another example, the user interface module 216 may generate a column chart with each column representing the total number of detected defects associated with each manufacturing site on January 6, 2017.

In addition to reporting output metrics to the requesting user 116, in some embodiment, the user interface module 216 may generate one or more alert notifications, e.g., in the form of popup message. For example, in response to an alert request set up by the requesting user 116, the user interface module 216 may generate an alert popup when a temperature captured by a particular sensor remains within a predetermined range of temperature for a predetermined amount of time. In another example, the alert notification may be generated when an anomaly or a defect pattern is detected in the event data by the analytic modules. In some embodiments, the user interface module 216 may generate a user interface for data model recommendation. For example, in response to a recommendation request initiated by the requesting user 116, the user interface module 216 may generate a recommendation user interface indicating the data elements that potentially impact each other due to the correlations between their values discovered during data analytics. In some embodiments, the user interface for data model recommendation may include a multidimensional graph visualizing the relationships between the data elements. Other types of user interface for displaying various types of analytic results are also possible and contemplated.

In some embodiments, the user interface module 216 may send the user interface data to an application (e.g., a web browser or a thin client application) in a client device (not shown) associated with the requesting user 116 via the communication unit 234, causing the application to display the analytic result (e.g., a numerical metric, a graph, an alert, a recommendation, etc.) for the analytic request in the corresponding user interface. In some embodiments, the user interface displaying the analytic results may include one or more selectable graphical elements that allow the requesting user to interact with the analytic results, e.g., exporting a selected portion of the analytic results to a data report, etc. In some embodiments, the user interface module 216 may be coupled to the serving module 214 to communicate the signal indicating the analytic request input by the requesting user 116 to the serving module 214. In some embodiments, the user interface module 216 may be coupled to the profile enabling module 208 to communicate the signal indicating the analytic profile enabled or disabled by the requesting user 116 to the profile enabling module 208.

The profile enabling module 208 may include software and/or logic to provide the functionality for enabling or disabling analytic profiles. For example, the profile enabling module 208 may receive a signal indicating an analytic profile enabled by the user 116, identify data attribute(s) associated with the enabled analytic profile, and communicate the identified data attribute(s) to the process archiving module 204 for parsing the incoming event data accordingly.

In some embodiments, the profile enabling module 208 may receive (e.g., from the user interface module 216) a signal for enabling or disabling analytic profile(s) associated with a data bucket. For example, the selected analytic profile(s) may be specified by the user 116 via the user interface for enabling and disabling analytic profiles. In some embodiments, each data bucket associated with an application ID may have a list of analytic profiles applicable to the event data in the data bucket. Each analytic profile in the list may be uniquely identified by a profile identifier (e.g., a profile ID) and may specify one or more analytic outputs, one or more data attributes, one or more algorithms for computing the analytic outputs from the data attributes, etc. In some embodiments, the user 116 may enable or disable one or more analytic profiles included in the list depending on the analytic outputs he or she is interested in. For example, a data bucket associated with a data center system having application ID of DC_AS3 may have a list of analytic profiles as follows:

Profile ID=m1: profile for data analytics regarding Data Center Operations;
Profile ID=m2: profile for data analytics regarding Workload Management;
Profile ID=m3: profile for data analytics regarding Graph Metrics;
Profile ID=m4: profile for data analytics regarding Six Sigma metrics;
Profile ID=m5: profile for data analytics regarding CPI metrics; and
Profile ID=m6: profile for data analytics regarding TQM metrics.

If the user 116 wants to inspect the operation of the data center system, the user 116 may enable the analytic profile m1. If the user 116 wants to review standard CPI metrics computed for the data center system, the user 116 may enable analytic profile m5. In one example, the user 116 may enable both analytic profile m1 and analytic profile m5. In another example, the analytic profile m1 may be automatically disabled when the analytic profile m5 is activated. The analytic profiles m1, m2, m3, m4, m5, and m6 may be created by administrators of the data center system DC_AS3. The above analytic profiles are merely illustrative examples, and it should be understood that other analytic profiles may be created to retrieve any set of attributes or calculations for any part of any process.

In some embodiments, the profile enabling module 208 may retrieve the enabled analytic profile(s) from the analytic profile storage 114 and may identify one or more data attributes (e.g., data elements and/or process parameters) specified in the enabled analytic profiles. In some embodiments, the profile enabling module 208 may communicate the identified data attributes to the process archiving module 204. For example, the profile enabling module 208 may instruct the process archiving module 204 to collect the identified data attributes from the incoming event data. In particular, the process archiving module 204 may parse the incoming event data of a process associated with the corresponding application ID to determine values of the identified data attributes. As discussed elsewhere herein, the process archiving module 204 may generate a first dataset entry for the process. The first dataset entry may include the determined values of the data attributes (e.g., in the form of key-value pairs) and may be stored in the data bucket associated with the application ID. In some embodiments, the profile enabling module 208 may also communicate the identified data attributes to the archived data managing module 206. For example, the profile enabling module 208 may instruct the archived data managing module 206 to organize the second dataset entries in the data bucket associated with the application ID based on the identified data attributes.

As an example, assuming that the user 116 enables the analytic profile m1 for the data bucket associated with application ID of DC_AS3. The analytic profile m1 may specify a list of analytic outputs describing data center operation, and a list of data elements and/or process parameters to be collected for calculating these analytic outputs. For example, the analytic outputs may include a metric of Power Usage Effectiveness (PUE) determined as follows:

$$PUE = \frac{\Sigma \text{ Total power usage of data center}}{\Sigma_{Processes} \Sigma_{Equipments} \text{ Power usage of equipment}}$$

In this example, the analytic profile m1 may specify that the data element(s) needed for computing the PUE metric include power usage of each equipment, and the process parameter(s) needed for computing the PUE metric may include type of equipment (e.g., computing engine (equipment=computing), network device (equipment=network), and non-data apparatus (equipment=other)) and type of process (e.g., performance monitoring service (process=perfmon), reporting service (process=reporting)) executed by the equipment. The profile enabling module 208 may communicate these data attributes to the process archiving module 204. The process archiving module 204 may extract the value of these data attributes from the incoming event data associated with the application ID of DC_AS3, generate a first dataset entry including the extracted values, and store the first dataset entry in the data bucket associated with the application ID of DC_AS3 in the archive storage 108. The profile enabling module 208 may communicate the data attributes to the archived data managing module 206. In this example, the archived data managing module 206 may use the process parameters "type of equipment" and "type of process" to organize the second dataset entries in the data bucket associated with the application ID of DC_AS3. For example, the archived data managing module 206 may group the second dataset entries in the data bucket of DC_AS3 into six following folders:

\DC_AS3\process=perfmon\equipment=computing;
\DC_AS3\process=perfmon\equipment=network;
\DC_AS3\process=perfmon\equipment=other;
\DC_AS3\process=reporting\equipment=computing;
\DC_AS3\process=reporting\equipment=network; and
\DC_AS3\process=reporting\equipment=other.

As illustrated in this example, the event data is advantageously processed and organized based on the analytic outputs that the user 116 desires to consume (e.g., PUE metric). As a result, the computation of these analytic outputs can be facilitated due to quick identification and retrieval of relevant event data, thereby improving the analytic efficiency.

In some embodiments, the profile enabling module 208 may identify one or more analytic outputs specified in the enabled analytic profile. The profile enabling module 208 may retrieve the batch views and the real-time views corresponding to these analytic outputs from the batch serving database and the real-time serving database in the process storage 112, and store these pre-computed views in the analytic profile storage 114. For example, in the above example with the analytic profile m1, the profile enabling module 208 may retrieve the batch view and the real-time views pre-computed for the PUE metric (and other metrics specified in the analytic profile m1) from the batch serving database and the real-time serving database, and store these views in the analytic profile storage 114. The batch view and the real-time views associated with the PUE metric may be stored together at the same storage location in the analytic profile storage 114, so that the serving module 214 can easily retrieve those precomputed views to generate the unified view when the PUE metric is requested by the user 116.

In some embodiments, the profile enabling module 208 may communicate the analytic outputs specified in the enabled analytic profile to the analytic modules (e.g., the batch analysis module 210 and the real-time analysis module 212). For example, the profile enabling module 208 may instruct the batch analysis module 210 and the real-time analysis module 212 to store the batch views and the real-time views associated with the analytic outputs in the analytic profile storage 114. In another example, the profile enabling module 208 may instruct the batch analysis module 210 and the real-time analysis module 212 to store these pre-computed views in both the analytic profile storage 114 and the process storage 112. In some embodiments, the precomputed views of the analytic outputs may be kept up to date in the analytic profile storage 114, for example, in a way similar to how the batch views and the real-time views are managed in the batch serving database and the real-time serving database of the process storage 112 as discussed elsewhere herein.

In some embodiments, the profile enabling module 208 may identify one or more algorithms specified in the enabled analytic profile and communicate these algorithms to the analytic modules (e.g., the batch analysis module 210, the real-time analysis module 212, and the serving module 214). In some embodiments, the batch analysis module 210 and the real-time analysis module 212 may apply these algorithms to compute the batch views and the real-time views for the analytic outputs specified in the enabled analytic profile. In some embodiments, the serving module 214 may apply these algorithms in combining the batch views and the real-time views to generate the unified views for the specified analytic outputs. Examples of the algorithms may include, but are not limited to, mathematical equations, learning models, statistical methods, incremental rules, etc.

In some embodiments, the profile enabling module 208 may communicate the data attributes (e.g., data elements and/or process parameters) associated with the enabled analytic profile to the process archiving module 204 and the archived data managing module 206. In some embodiments, the profile enabling module 208 may communicate the analytic outputs and the algorithms specified in the enabled analytic profile to the analytic modules. In some embodiments, the profile enabling module 208 may retrieve the precomputed views (e.g., the batch views and the real-time views) corresponding to the analytic outputs specified in the enabled analytic profile from the process storage 112, and store these precomputed views in the analytic profile storage 114.

Figure 3:
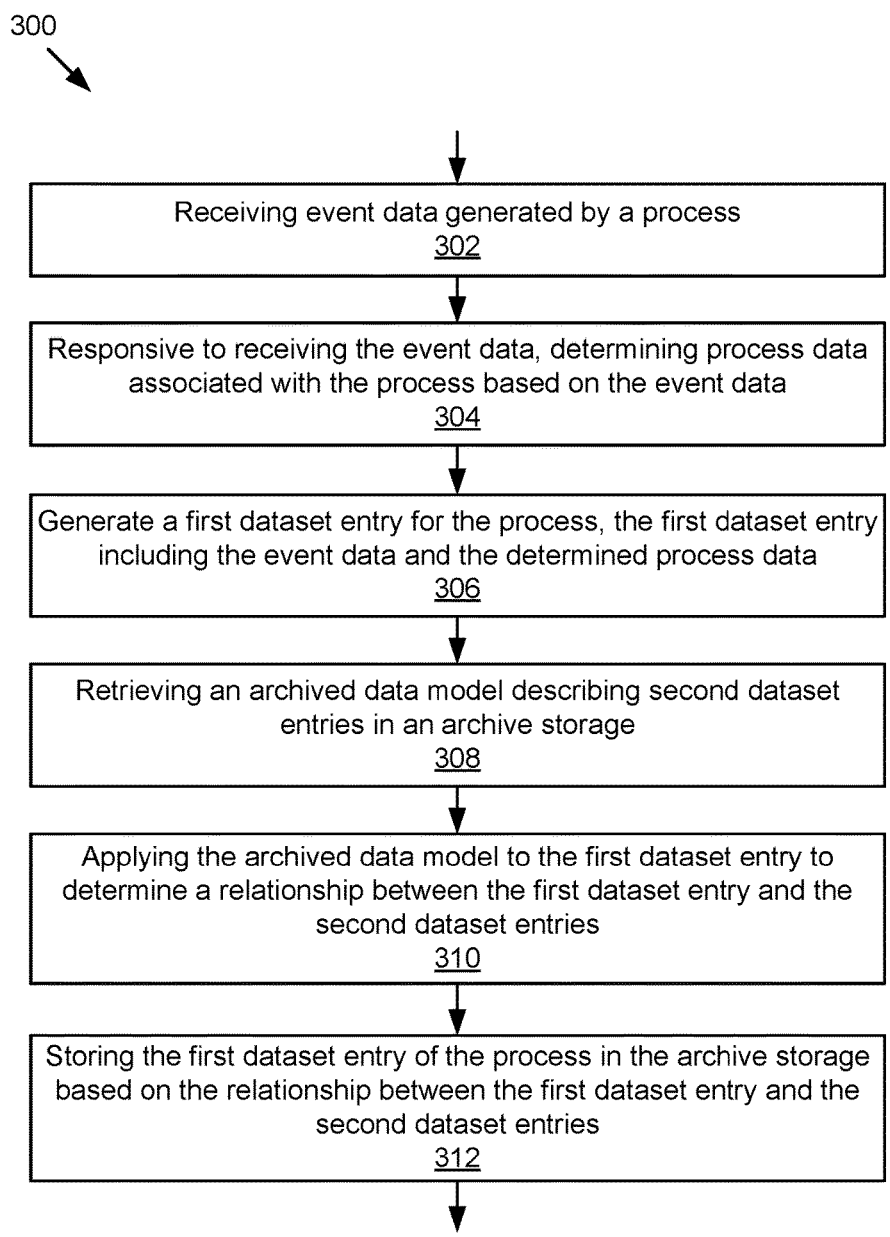
FIG. 3 is a flow diagram illustrating an example method for storing data in an archive storage.

FIG. 3 is a flow diagram illustrating an example method 300 for storing data in an archive storage, for example using the smart analytic engine 110. The method assumes a process (identified process) has been identified and that process is operational on the application system 118 and/or the process implementing system 120. As part of the execution of the identified process, the application system 118 and/or the process implementing system 120 generate data related to the identified process. In block 302, the data ingestion module 202 may receive event data generated by an identified process, e.g. from the application system 118 or the process implementing system 120. In block 304, responsive to receiving the event data, the process archiving module 204 may determine process data associated with the process based on the event data. The process data is determined when the event data is ingested from the data sources, prior to data archiving and prior to data analytics. In some embodiments, the process archiving module 204 may also generate process metadata from the event data and the process data. The process metadata may be the enhanced data of the event data and/or the process data. In block 306, the data process archiving module 204 may generate a first dataset entry for the identified process. The first dataset entry may include the event data received by the data ingestion module 202 and the process data determined by the process archiving module 204. In some embodiments, the first dataset entry may also include the process metadata. In some embodiments, the first dataset entry may include the value of one or more data attributes (e.g., in the form of key-value pairs).

The method may continue to block 308. In block 308, the process archiving module 204 may receive an archived data model describing second dataset entries in an archive storage. For example, the process archiving module 204 may receive the archived data model describing the correlations among the second dataset entries in the archive storage 108. In block 310, the process archiving module 204 may apply the archived data model to the first dataset entry to determine a relationship between the first dataset entry and the second dataset entries. For example, the process archiving module 204 may identify a cluster of second dataset entries to which the first dataset entry is most similar using a clustering algorithm. In block 312, the process archiving module 204 may store the first dataset entry of the process in the archive storage based on the relationship between the first dataset entry and the second dataset entries. For example, the process archiving module 204 may store the first dataset entry in the same dataset (e.g., within the same folder in the archive storage 108) associated with the cluster of second dataset entries to which the first dataset entry belongs.

Figure 4:
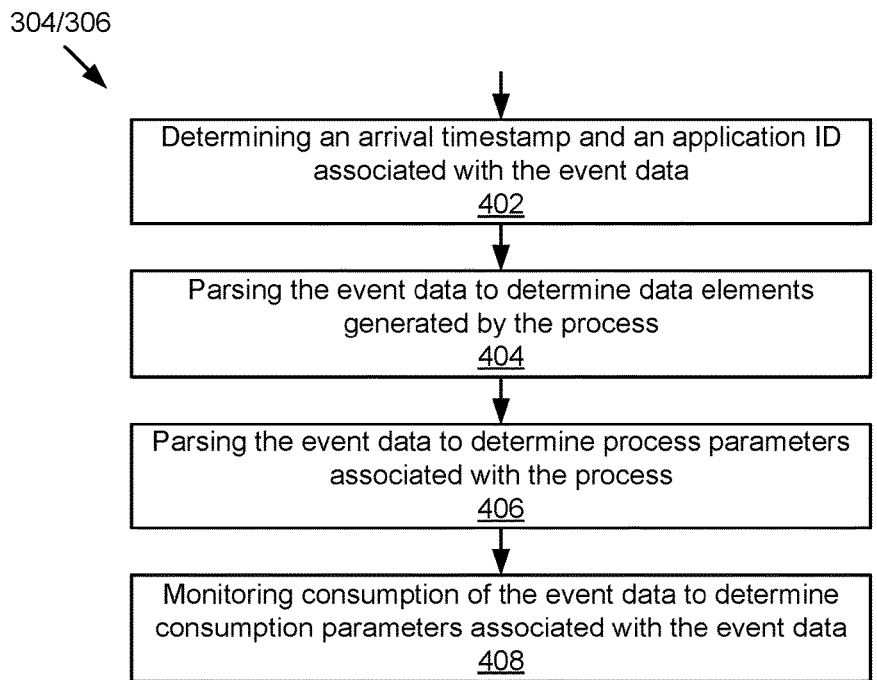
FIG. 4 is a flow diagram illustrating an example method for extracting data attributes from incoming event data.

FIG. 4 is a flow diagram illustrating an example embodiment of block 304 and block 306 for extracting data attributes from the incoming event data. In some embodiments, the data attributes may include data elements and process data. As discussed elsewhere herein, the data elements may be generated by the process and reflect the performance of the process. On the other hand, the process data may describe the process by providing context information of the process. The process data may include arrival timestamp associated with the event data, application ID associated with the event data, process parameters and consumption parameters associated with the event data. In block 402, the process archiving module 204 may determine arrival timestamp and application ID associated with the event data. For example, the data ingestion module 202 may receive a set of event data on January 5, 2017 at 1.30 PM from a manufacturing system having an application ID of MFG_WD. The process archiving module 204 may determine that the set of event data is associated with an arrival timestamp of January 5, 2017: 1.30 PM and an application ID of MFG_WD. In block 404, the process archiving module 204 may parse the event data to determine the data elements generated by the process. For example, the process archiving module 204 may extract value of various factors generated by equipment of the manufacturing system MFG_WD from the set of event data.

The method 304/306 may continue to block 406. In block 406, the process archiving module 204 may parse the event data to determine the process parameters associated with the process. For example, the process archiving module 204 may determine from the set of event data process ID, phase ID, equipment ID, temporal coordinates, spatial coordinates (X, Y, and Z coordinates of sensor(s) in a manufacturing site, etc.), frequency of data generation, etc. In block 408, the process archiving module 204 may monitor consumption of the event data to determine consumption parameters associated with the event data. In particular, the process archiving module 204 may store the incoming event data associated with the process in the active storage 122 and monitor the consumption of the event data in the active storage 122 to determine the consumption parameters. For example, the process archiving module 204 may determine frequency of data consumption, recent consumer IDs, frequent consumer IDs, etc. In some embodiments, when the frequency of data consumption associated with event data of a process satisfies a threshold frequency (e.g., 3 times per week), the process archiving module 204 may move the event data from the active storage 122 to the archive storage 108 for archiving the corresponding process in the archive storage 108. In some embodiments, the process archiving module 204 may generate a first dataset entry for the process. The first dataset entry may include the determined data elements and the determined process data (e.g., arrival timestamp, application ID, process parameters, and consumption parameters) associated with the process. In some embodiments, the process archiving module 204 may generate process metadata from the data elements and the process data. For example, the process archiving module 204 may generate enhanced data of the data elements and/or the process data by determining additional data attributes, replacing incomplete data attributes with ones in complete format, etc. In these embodiments, one or more data attributes in the first dataset entry may be subjected to or generated by data enhancement.

Figure 5:
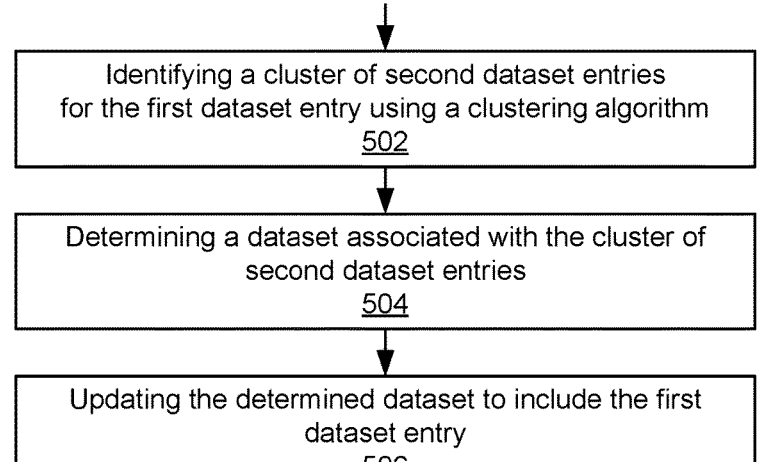
FIG. 5 is a flow diagram illustrating an example method for optimally storing data within an archive storage.

FIG. 5 is a flow diagram illustrating an example embodiment of block 310 and block 312 for storing data within an archive storage. For example, the process archiving module 204 may efficiently store the first dataset entry in the archive storage 108 as follows. In block 502, the process archiving module 204 may identify a cluster of second dataset entries in the archived data model for the first dataset entry using a cluster algorithm. For example, the process archiving module 204 may assign the first dataset entry to a cluster of second dataset entries to which the first dataset entry is most similar in terms of process data or process metadata (e.g., the enhanced data of the data elements and/or the process data) using K-means clustering. In block 504, the process archiving module 204 may determine a dataset associated with the cluster of second dataset entries. In some embodiments, the second dataset entries classified into the same cluster in the archived data model may be stored together in the same dataset. Each dataset may be stored in a separate data file or in a separate folder of the archive storage 108. In block 506, the process archiving module 204 may update the determined dataset to include the first dataset entry. Accordingly, the first dataset entry may be stored in the same storage location with the second dataset entries similar to it (e.g., the second dataset entries that share common value of one or more process parameters with the first dataset entry) in the archive storage 108.

Figure 6:
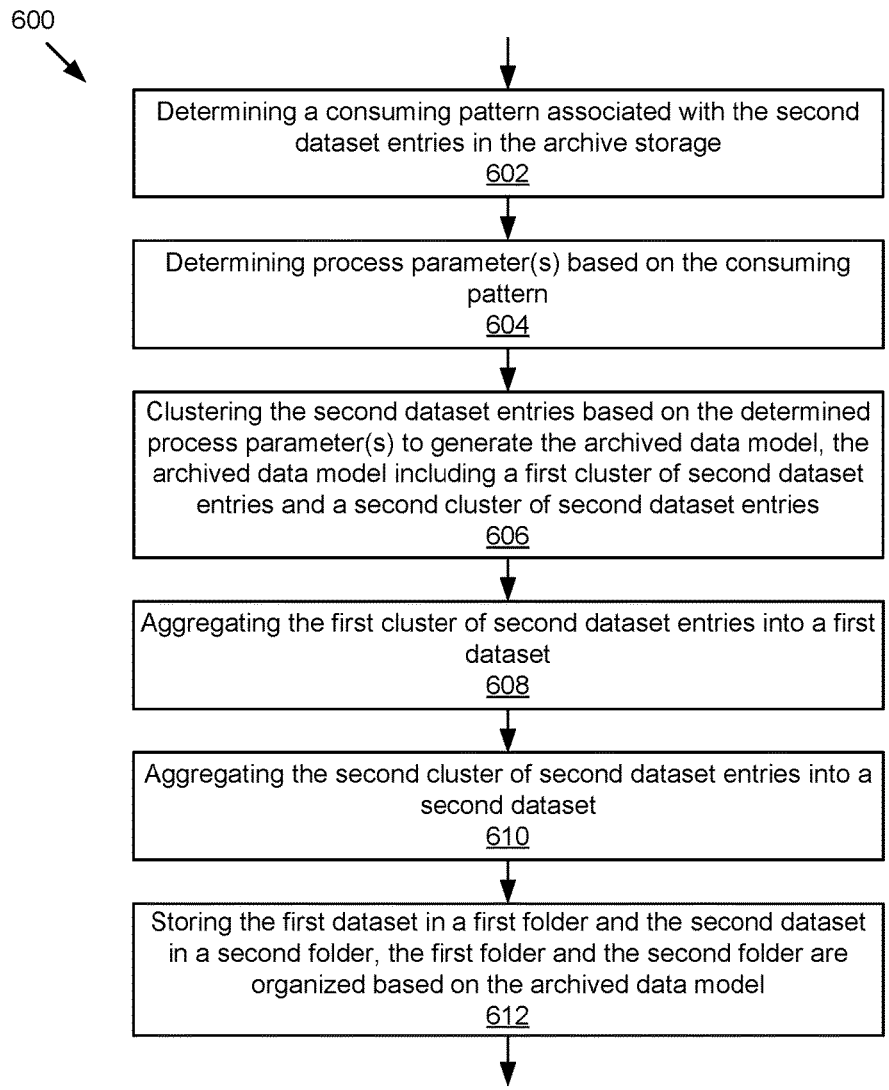
FIG. 6 is a flow diagram illustrating an example method for generating an archived data model and organizing the data in the archive storage based on the archived data model.

FIG. 6 is a flow diagram illustrating an example method 600 for generating an archived data model and organizing the data in the archive storage based on the archived data model. In block 602, the archived data managing module 206 may determine the consuming patterns associated with the second dataset entries in the archive storage. For example, the archived data managing module 206 may monitor the consuming pattern of the second dataset entries in the data bucket associated with the manufacturing system MFG_WD in the archive storage 108. The archived data managing module 206 may determine that these second dataset entries are often requested based on the value of manufacturing site and product ID. In block 604, the archived data managing module 206 may determine one or more process parameters based on the consuming pattern. The determined process parameters may be used as clustering factors to cluster the second dataset entries in the corresponding data bucket. In this example, the archived data managing module 206 may determine that the process parameters for clustering the second dataset entries in the data bucket of MFG_WD are manufacturing site and product ID.

The method 600 may continue to block 606. In block 606, the archived data managing module 206 may cluster the second dataset entries based on the determined process parameters to generate the archived data model. The archived data model may include a first cluster of second dataset entries and a second cluster of second dataset entries. In block 608, the archived data managing module 206 may aggregate the first cluster the second dataset entries into a first dataset. In block 610, the archived data managing module 206 may aggregate the second cluster the second dataset entries into a second dataset. In block 612, the archived data managing module 206 may store the first dataset in a first folder and the second dataset in a second folder in the archive storage 108. The first folder and the second folder may be organized based on the archived data model. For example, the archived data managing module 206 may cluster the second dataset entries in the data bucket of MFG_WD based on manufacturing site (e.g., Singapore, Japan, and China) and product ID (e.g., "cbf" and "cbg") to generate the archived data model. Under the data bucket of MFG_WD in the archive storage 108, the archived data managing module 206 may create three first-level folders associated with the manufacturing site of Singapore, Japan, and China. Within each first-level folder, the archived data managing module 206 may create two second-level folders associated with the product ID of "cbf" and "cbg." Thus, the folders within the data bucket of MFG_WD is structured according to the archived data model. Each cluster of second dataset entries in the archived data model may be stored in the folder corresponding to their values of manufacturing site and product ID.

Figure 7:
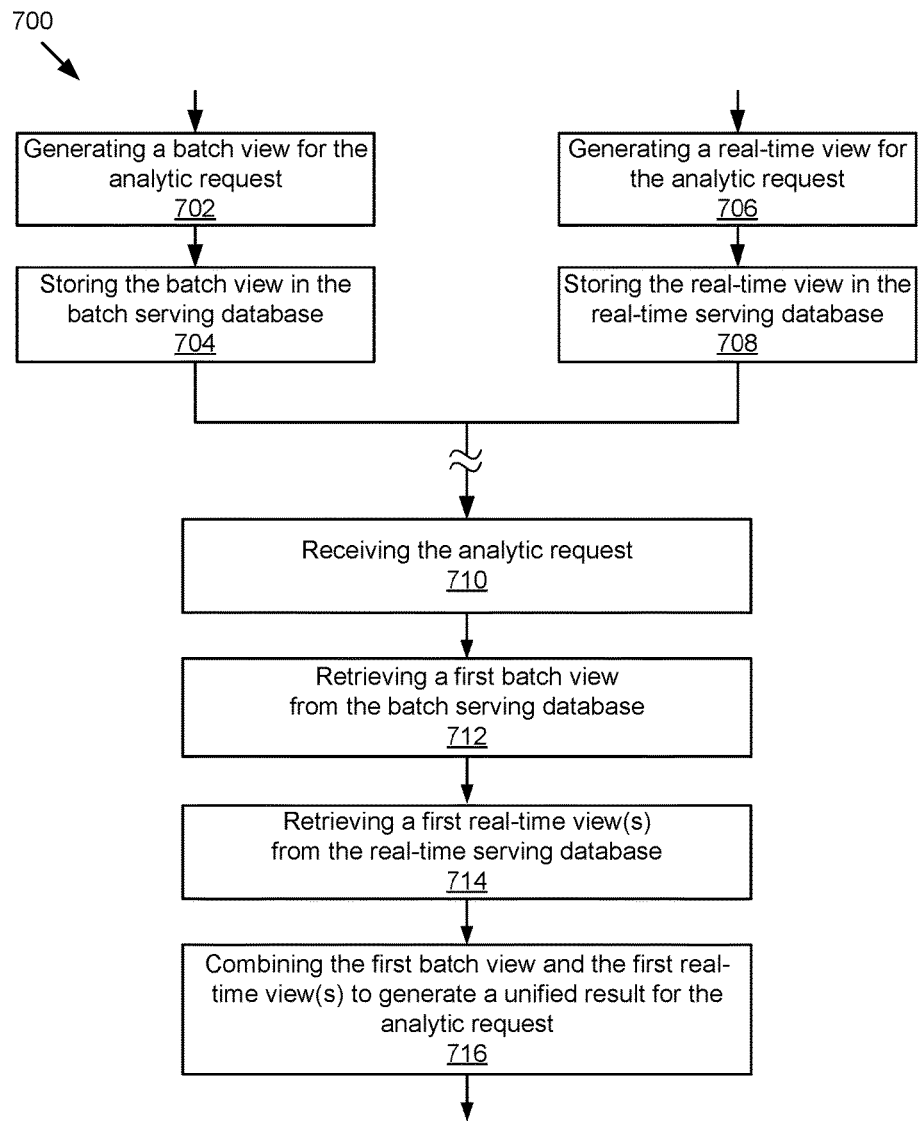
FIG. 7 is a flow diagram illustrating an example method for generating a unified result for an analytic request.

FIG. 7 is a flow diagram illustrating an example method 700 for generating a unified result for an analytic request. In block 702, the batch analysis module 210 may generate a batch view for an analytic request requesting an analytic output. For example, the batch analysis module 210 may calculate an analytic output of total number of detected defects associated with manufacturing site of Singapore and product ID of "cbg" to generate a batch view. In some embodiments, the batch analysis module 210 may generate the batch view using all second dataset entries available in the corresponding data bucket (e.g., the data bucket of MFG_WD) when the batch cycle starts. The batch view may be associated with a batch processing timestamp identifying the latest second dataset entry reflected in the batch view. In some embodiments, the batch analysis module 210 may generate the batch view prior to the analytic request is initiated by the requesting user. In block 704, the batch analysis module 210 may store the generated batch view in the batch serving database.

In block 706, the real-time analysis module 212 may generate a real-time view for the analytic request. For example, the real-time analysis module 212 may calculate an analytic output of total number of detected defects associated with manufacturing site of Singapore and product ID of "cbg" to generate a real-time view. In some embodiments, the real-time analysis module 212 may generate the real-time view using the second dataset entries in the corresponding data bucket that are not yet included in batch computation and previous real-time analysis computation. The real-time view may be associated with a processing timestamp identifying the latest second dataset entry reflected in the real-time view. In some embodiments, the real-time analysis module 212 may generate the real-time view periodically or at the time the analytic request is initiated by the requesting user. In block 708, the real-time analysis module 212 may store the generated real-time view in the real-time serving database.

In block 710, the serving module 214 may receive the analytic request initiated by the requesting user. For example, the serving module 214 may receive the analytic request requesting the total number of detected defects associated with manufacturing site of Singapore and product ID of "cbg" from the user interface module 216. As illustrated in FIG. 7, this analytic request may be initiated by the requesting user at any time, regardless of the progress of the batch computation and/or real-time analysis computation. In block 712, the serving module 214 may receive a first batch view from the batch serving database. For example, the serving module 214 may receive the first batch view pre-computed for the analytic output of total number of detected defects associated with manufacturing site of Singapore and product ID of "cbg" from the batch serving database. In some embodiments, only the batch view generated most recently for the analytic output may be retained in the batch serving database as the first batch view while the older batch views may be discarded.

The method 700 may continue to block 714. In block 714, the serving module 214 may receive one or more first real-time views from the real-time serving database. For example, the serving module 214 may receive one or more first real-time views pre-computed for the analytic output of total number of detected defects associated with manufacturing site of Singapore and product ID of "cbg" from the real-time serving database. In some embodiments, only the real-time view(s) corresponding to the first batch view currently stored in the batch serving database may be retained in the real-time serving database as the first real-time view(s). In particular, only the real-time view(s) generated from recent dataset entries that are not captured in the first batch view may be stored in the real-time serving database while the older real-time views may be discarded. In block 716, the serving module 214 may combine the first batch view and the one or more first real-time views to generate a unified view. The algorithm to combine the batch view and the real-time view(s) may be specific to the analytic output. In the above example, the serving module 214 may compute a sum of the total number of detected defects found in the first batch view and the total number of detected defects in the one or more first real-time view(s) to generate the unified view for the total number of detected defects found. The generated unified view may be delivered to the requesting user as an ultimate result for the analytic request. It should be understood that the combination of the analytics of batch data processing and real-time data processing are merely used by way of example, and that process described above with reference to FIG. 7 can be applied to other combinations of analytic measures to generate other embodiments of unified views.

Figure 8:
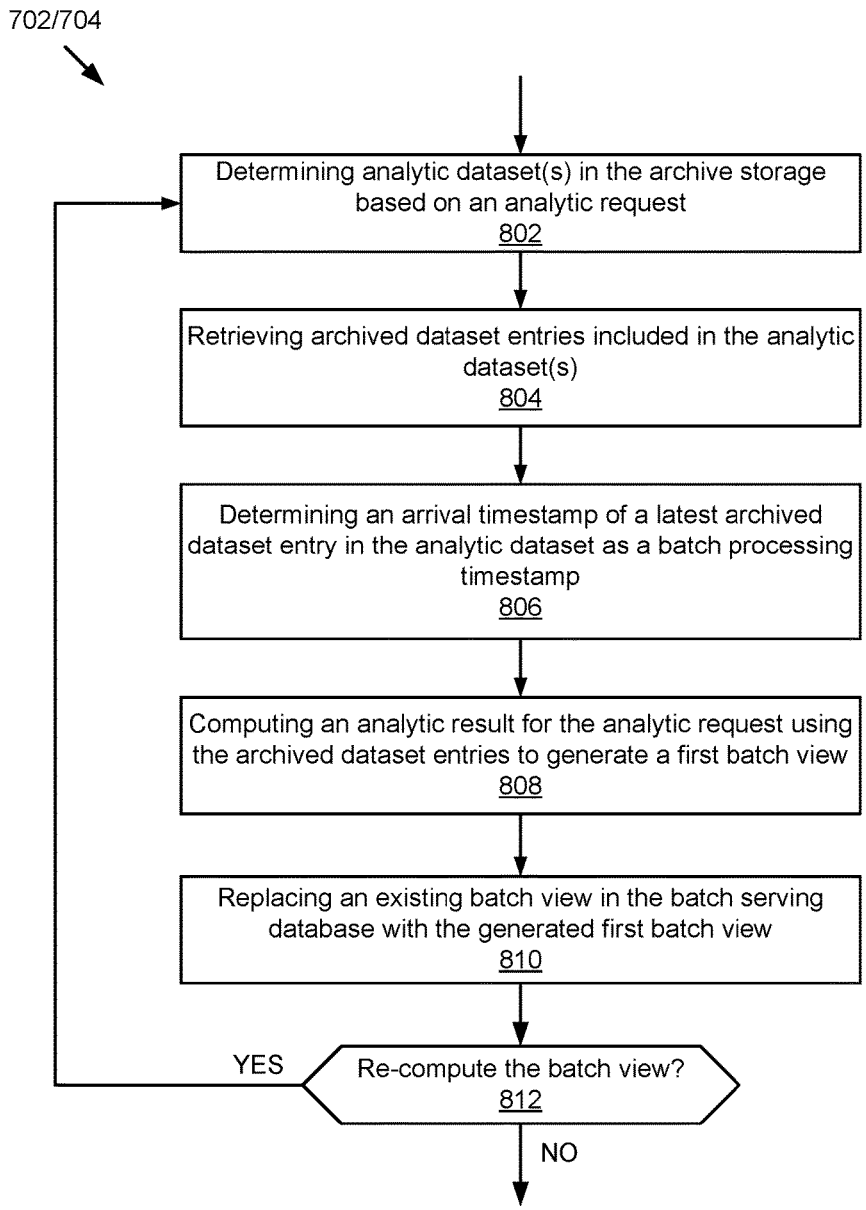
FIG. 8 is a flow diagram illustrating an example method for performing batch analytics.

FIG. 8 is a flow diagram illustrating an example embodiment of block 702 and block 704 for performing batch analytics to generate a batch view. In block 802, the batch analysis module 210 may determine an analytic dataset in the archive storage based on an analytic request. For example, the batch analysis module 210 may determine that the analytic dataset to pre-compute a batch view for the analytic output of total number of detected defects associated with manufacturing site of Singapore and product ID of "cbg" includes the second dataset entries in the following folder of the archive storage 108:

\MFG_WD\site=SGP\product=cbg.

In block 804, the batch analysis module 210 may retrieve the archived dataset entries included in the determined analytic dataset. In block 806, the batch analysis module 210 may determine an arrival timestamp of a latest archived dataset entry in the analytic dataset as a batch processing timestamp. For example, assuming that there are 10,000 second dataset entries in the folder "\MFG_WD\site=SGP\product=cbg" of the archive storage 108, and the latest second dataset entry in these 10,000 second dataset entries has the arrival timestamp of January 7, 2017: 9.15 AM. The batch analysis module 210 may retrieve 10,000 second dataset entries from the folder to compute a first batch view and determine the batch processing timestamp of the first batch view to be January 7, 2017: 9.15 AM. In block 808, the batch analysis module 210 may compute an analytic result for the analytic request using the archived dataset entries to generate a first batch view. For example, the batch analysis module 210 may compute the total number of detected defects using data elements of 10,000 second dataset entries to generate the first batch view for the analytic output of "total number of detected defects" associated with manufacturing site of Singapore and product ID of "cbg." In block 810, the batch analysis module 210 may replace an existing batch view of the analytic output in the batch serving database with the generated first batch view. Accordingly, the batch serving database may store only the batch view generated most recently. In block 812, the batch analysis module 210 may determine whether to recompute the batch view. If the batch analysis module 210 determines at 812 that the batch view is recomputed (e.g., in the embodiments where the batch analysis module 210 recomputes the batch view repeatedly), the method 702/704 may proceed to block 802 to start a new batch cycle in which a second batch view is generated to replace the first batch view. If the batch analysis module 210 determines at 812 that the batch view is not recomputed (e.g., in the embodiments where the batch analysis module 210 only computes the batch view at scheduled time), the method 702/704 ends.

Figure 9A:
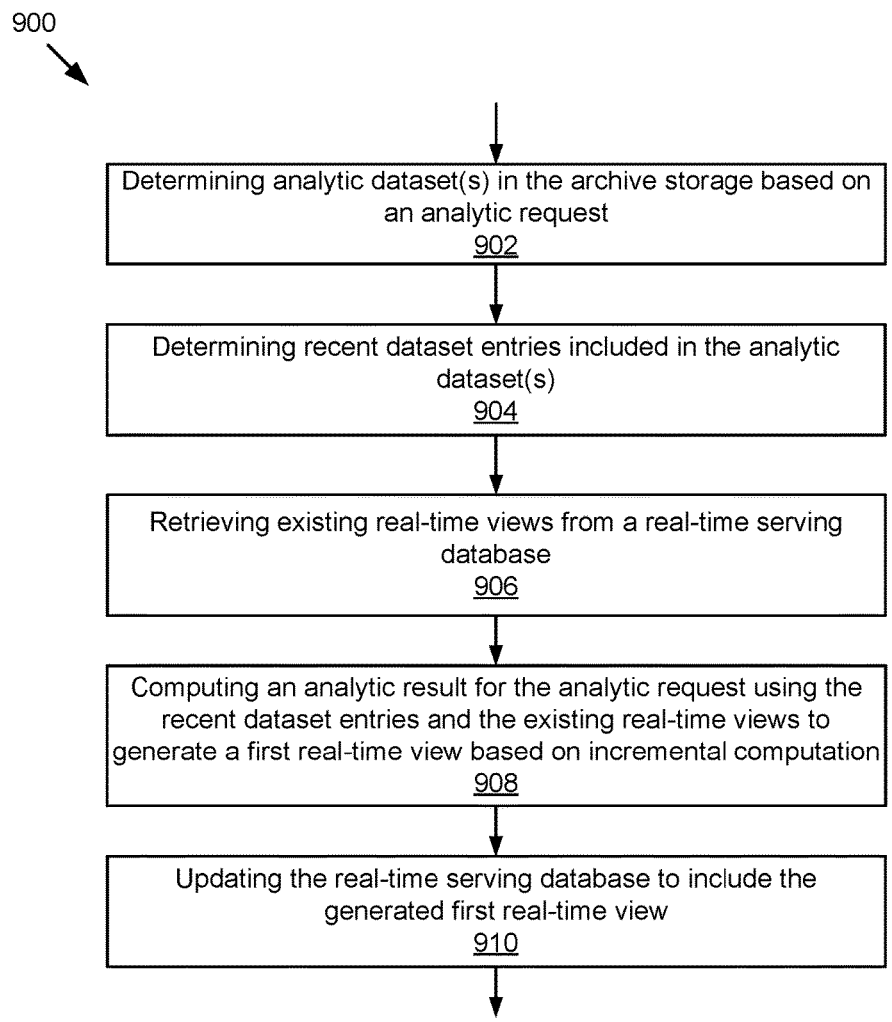
FIG. 9A is a flow diagram illustrating a first embodiment of an example method for performing real-time analysis.

FIG. 9A is a flow diagram illustrating a first embodiment of an example method 900 for performing real-time analysis to generate a real-time view. In block 902, the real-time analysis module 212 may determine an analytic dataset in the archive storage based on an analytic request. In block 904, the real-time analysis module 212 may determine recent dataset entries included in the determined analytic dataset. In some embodiments, the recent dataset entries may be the second dataset entries in the analytic dataset that are not reflected in the batch view and not reflected in the existing real-time view(s) computed previously. In block 906, the real-time analysis module 212 may receive the existing real-time view(s) from the real-time serving database. In block 908, the real-time analysis module 212 may compute an analytic result for the analytic request using the recent dataset entries and the existing real-time views to generate a first real-time view based on incremental computation. As discussed elsewhere herein, with the incremental computing approach in which the difference compared to the existing real-time view(s) is processed and only the recent dataset entries are subject to real-time processing, the first real-time view can be generated a lot faster than the first batch view, which is computed from scratch using all second dataset entries that have been archived in the corresponding folder(s). In block 910, the real-time analysis module 212 may update the real-time serving database to include the generated first real-time view.

Figure 9B:
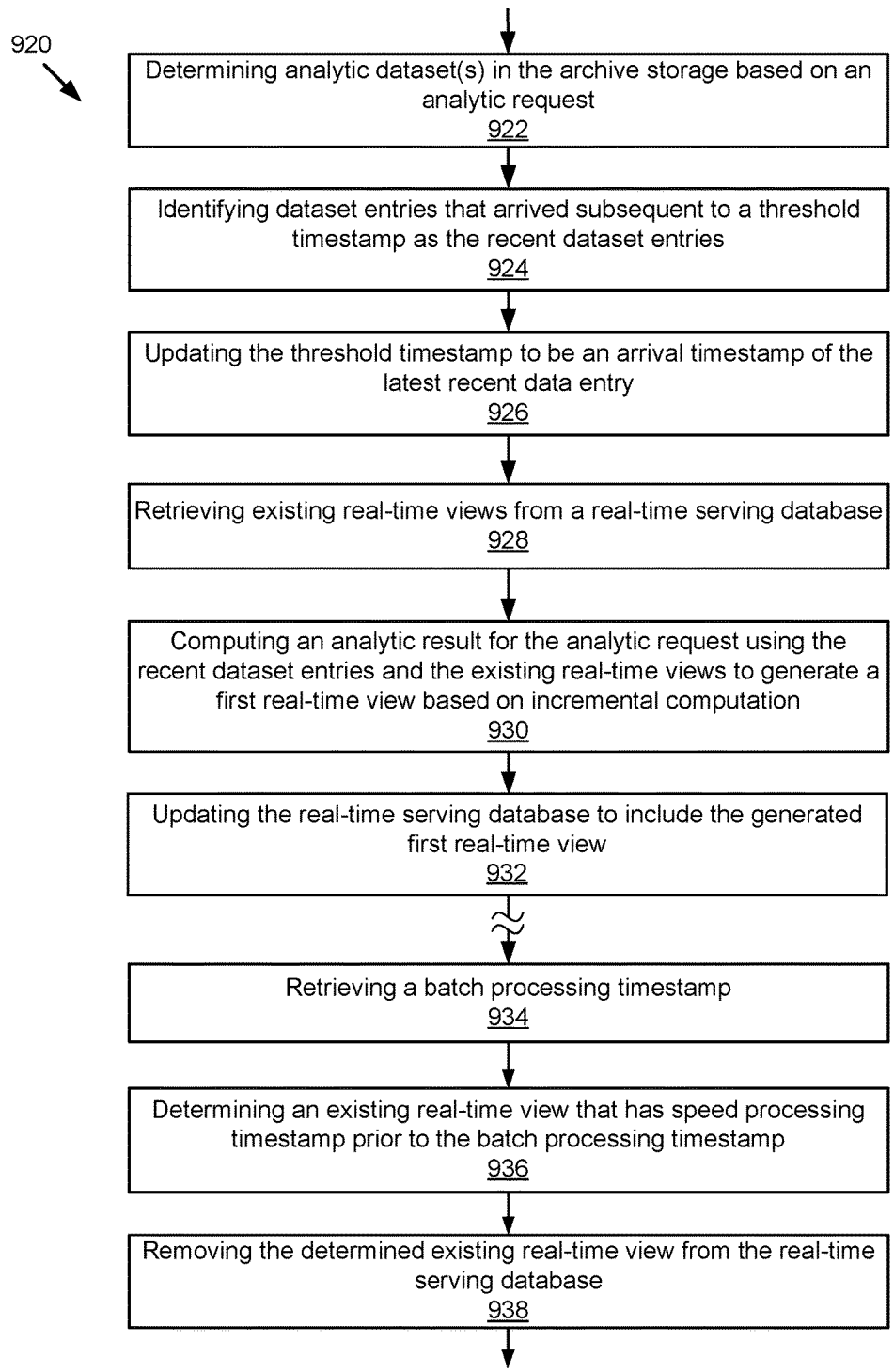
FIG. 9B is a flow diagram illustrating a second embodiment of an example method for performing real-time analysis.

FIG. 9B is a flow diagram illustrating a second embodiment of an example method 920 for performing real-time analysis to generate a real-time view. In block 922, the real-time analysis module 212 may determine an analytic dataset in the archive storage based on an analytic request. For example, the real-time analysis module 212 may determine that the analytic dataset to compute a real-time view for the analytic output of total number of detected defects associated with manufacturing site of Singapore and product ID of "cbg" includes the second dataset entries in the following folder of the archive storage 108:

\MFG_WD\site=SGP\product=cbg.

The method 920 may continue to block 924 to determine recent dataset entries. In block 924, the real-time analysis module 212 may identify the second dataset entries in the determined analytic dataset that arrived subsequent to a threshold timestamp as the recent dataset entries. In some embodiments, the threshold timestamp may be the latest processing timestamp among the processing timestamps of the existing real-time views stored in the real-time serving database. For example, assuming that there are four real-time views (real-time view 1, real-time view 2, real-time view 3, and real-time view 4) currently stored in the real-time serving database, and the real-time view 4 has the latest processing timestamp of January 7, 2017: 9.45 AM. The real-time analysis module 212 may determine the threshold timestamp to be January 7, 2017: 9.45 AM. The real-time analysis module 212 may determine the second dataset entries in the folder "\MFG_WD\site=SGP\product=cbg" that arrived subsequent to the threshold timestamp as recent dataset entries. In this example, assuming that there are 15 recent dataset entries in the analytic dataset being identified, and the latest dataset entry in these 15 recent dataset entries has the arrival timestamp of January 7, 2017: 10.25 AM. In block 926, the real-time analysis module 212 may update the threshold timestamp to be an arrival timestamp of the latest recent dataset entry. For example, the real-time analysis module 212 may update the threshold timestamp to be January 7, 2017: 10.25 AM.

The method 920 may proceed to block 928. In block 928, the real-time analysis module 212 may receive the existing real-time views from the real-time serving database. For example, the real-time analysis module 212 may retrieve the real-time view 1, real-time view 2, real-time view 3, and real-time view 4 from the real-time serving database. In block 930, the real-time analysis module 212 may compute an analytic result for the analytic request using the recent dataset entries and the existing real-time views to generate a first real-time view based on incremental computation. For example, the real-time analysis module 212 may compute a total number of detected defects using four existing real-time views and 15 recent dataset entries to generate a real-time view 5. The algorithm to perform incremental computation on the existing real-time views and the recent dataset entries may be specific to the analytic output. For example, in order to compute the real-time view 5 for the analytic output of total number of detected defects associated with manufacturing site of Singapore and product ID of "cbg," the real-time analysis module 212 may add the number of detected defects included in data elements of the 15 recent dataset entries to the total number of detected defects in the real-time view 4. The real-time view 5 may be assigned a processing timestamp of January 7, 2017: 10.25 AM, based on the arrival timestamp of the latest dataset entry in the 15 recent dataset entries captured by the realtime view 5. In block 932, the real-time analysis module 212 may update the real-time serving database to include the generated first real-time view. For example, the real-time analysis module 212 may update the real-time serving database to include the real-time view 5.

The method 920 may proceed to block 934 to remove the real-time view(s) that are reflected in the batch view from the real-time serving database. As depicted in FIG. 9B, block 932 is not necessarily followed by block 934. Instead, block 934 may occur at any time the batch analysis module 210 completes a batch cycle and replaces an existing batch view with a newly generated batch view in the batch serving database. In block 934, the real-time analysis module 212 may receive a batch processing timestamp of a newly computed batch view from the batch analysis module 210. In the above example, the real-time analysis module 212 may receive the batch processing timestamp of the first batch view (e.g., January 7, 2017: 9.15 AM). In block 936, the real-time analysis module 212 may determine one or more existing real-time views that have processing timestamp prior to the batch processing timestamp in the real-time serving database. In block 938, the real-time analysis module 212 may remove the determined existing real-time views from the real-time serving database. Continue the above example, assuming that the real-time serving database stores the following five real-time views when the computation of the first batch view is completed:

Real-time view 1: January 7, 2017: 8.00 AM;
Real-time view 2: January 7, 2017: 8.45 AM;
Real-time view 3: January 7, 2017: 9.30 AM;
Real-time view 4: January 7, 2017: 9.45 AM; and
Real-time view 5: January 7, 2017: 10.25 AM.

The real-time analysis module 212 may determine that the real-time view 1 and the real-time view 2 have the processing timestamps prior to the batch processing timestamp of the first batch view (e.g., January 7, 2017: 9.15 AM), and thus, the event data covered in the real-time view 1 and the real-time view 2 is now taken into account in the first batch view. Therefore, the real-time analysis module 212 may remove the real-time view 1 and the real-time view 2 from the real-time serving database. The real-time view 3, the real-time view 4, and the real-time view 5 may be retained in the real-time serving database and may be used together with the first batch view to compute the ultimate analytic result, in case the requesting user 116 initiates the corresponding analytic request.

Figure 10:
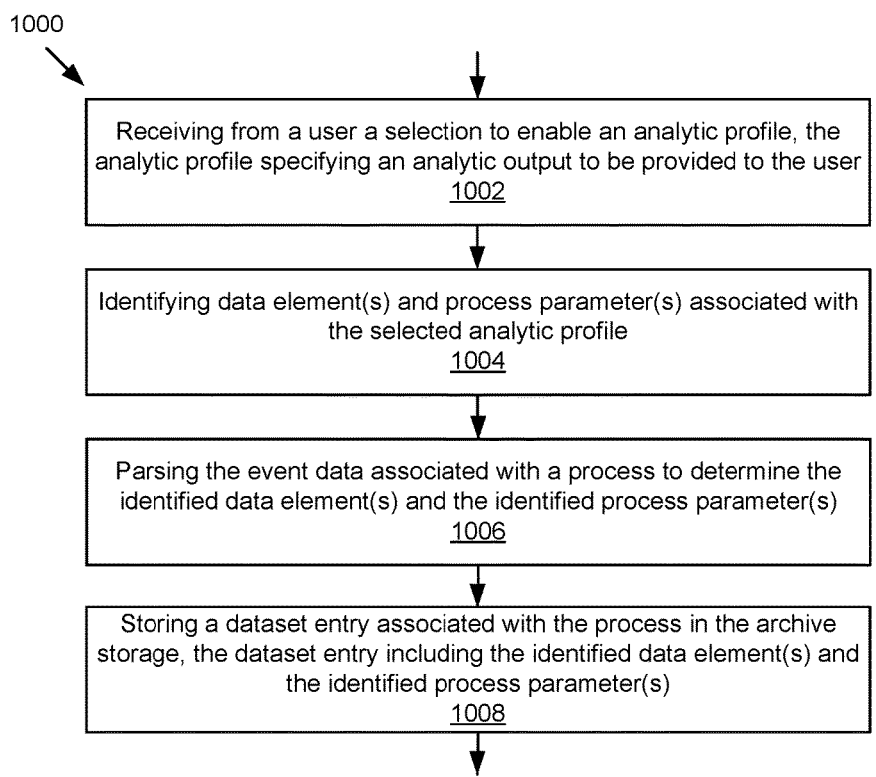
FIG. 10 is a flow diagram illustrating an example method for enabling an analytic profile selected by a user.

FIG. 10 is a flow diagram illustrating an example method 1000 for enabling an analytic profile selected by a user. In block 1002, the user interface module 216 may receive a selection to enable an analytic profile for a data bucket from a user. For example, the user 116 may enable an analytic profile regarding CPI metrics for a data bucket associated with a data center system. In some embodiments, the analytic profile may specify one or more analytic outputs to be provided to the user. In some embodiments, the analytic profile may also specify one or more data attributes (e.g., data elements and/or process parameters) required to compute the analytic outputs and one or more algorithms for computing the analytic outputs from the data attributes. In block 1004, the profile enabling module 208 may identify the data elements and the process parameters associated with the selected analytic profile. In some embodiments, the profile enabling module 208 may communicate the data elements and the process parameters to the process archiving module 204. In some embodiments, the profile enabling module 208 may communicate the algorithms to the batch analysis module 210, the real-time analysis module 212, and the serving module 214.

The method 1000 may continue to block 1006. In block 1006, the process archiving module 204 may parse the event data associated with a process to determine the identified data element(s) and the identified process parameter(s). For example, the process archiving module 204 may parse the incoming event data to be stored in the data bucket (e.g., the data bucket for which the selected analytic profile is enabled) to determine the value of the identified data attributes for a process. In block 1008, the process archiving module 204 may generate and store a dataset entry associated with the process in the archive storage. The dataset entry may include the identified element(s) and the identified process parameter(s). For example, the process archiving module 204 may generate a first dataset entry for the process. The first dataset entry may include the value of identified data elements and the identified process parameters extracted from the event data. In some embodiments, the data elements and the process parameters may be subjected to data enhancement. The process archiving module 204 may then store the first dataset entry in the data bucket in the archive storage 108.

Figure 11:
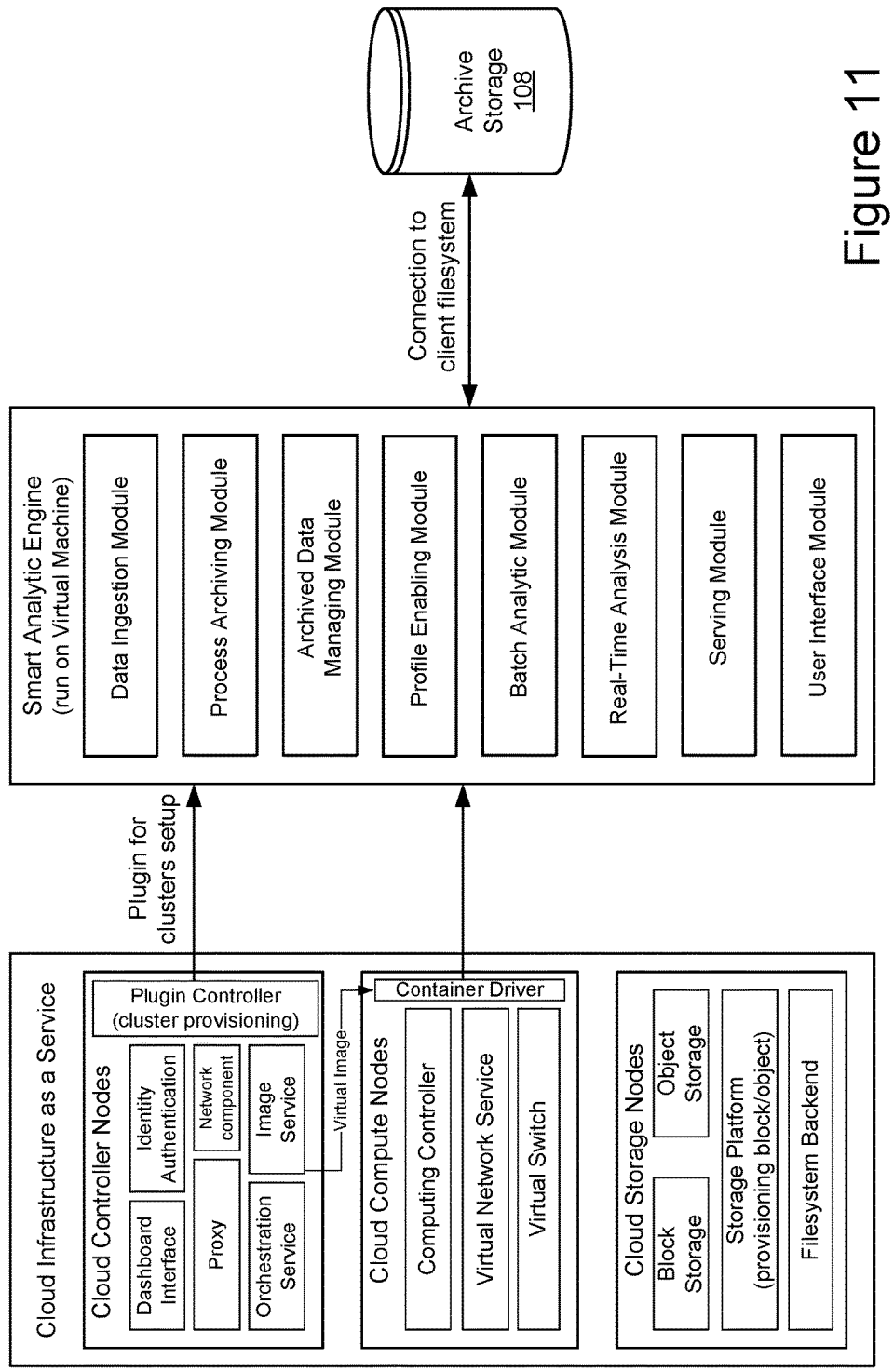
FIG. 11 is a block diagram illustrating an embodiment of a smart archive platform implemented on a cloud computing environment.

FIG. 11 is a block diagram illustrating an embodiment of the smart archive platform 104 implemented on a cloud computing environment. As depicted, the smart archive platform 104 may be deployed with Infrastructure as a Service (IaaS) model. In particular, the smart analytic engine 110 of the smart archive platform 104 may be implemented on a cloud infrastructure of the cloud computing environment and provide services to multiple client entities (e.g., the application systems 118 and/or the process implementing systems 120). For example, the smart analytic engine 110 may be connected to the filesystems (e.g., the archive storage 108) of the client entities to advantageously archive the incoming event data in the filesystems and performs data analytics on the archived event data in an efficient and timely manner as discussed elsewhere herein.

In some embodiments, the cloud infrastructure may include a plurality of cloud storage nodes, cloud compute nodes, and cloud controller nodes. In some embodiments, the cloud controller node may include a plugin controller. The plugin controller may perform hardware virtualization on the physical resources of the cloud storage nodes, the cloud compute nodes, and the cloud controller nodes to create and manage a plurality of virtual machines. In some embodiments, each virtual machine may be logically isolated from each other and may function as a separate computing engine (e.g., a virtual server) on which different operating systems and applications can be installed. The components of the smart analytic engine 110 may be hosted and executed on these virtual machines. As an example, virtual images of a server operating system with the components of the smart analytic engine 110 installed may be generated. The virtual images may replicate all software components (e.g., files, environment variables, libraries, configurations, etc.) necessary to run the respective components of the smart analytic engine 110 as if they are deployed on a pool of physical servers. In some embodiments, a virtual image may be used as a template to create a container. The container may be an executable instance of the virtual image and may be launched by container driver of the cloud compute node(s) to provision virtual servers running the components of the smart analytic engine 110. In some embodiments, the containers may be portable and thus, the smart analytic engine 110 contained in the containers may easily be migrated to different cloud compute nodes or to a different cloud computing environment.

A system and method for archiving and analyzing data has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "generating", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a non-transitory computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A system comprising:
a data repository for storing data;
a data ingestion module having an input coupled to receive event data associated with a process and an output coupled to the data repository, the data ingestion module operable to:
receive the event data; and
temporarily store the event data; and
a process archiving module having an input coupled to the data ingestion module to receive the event data associated with the process and an output coupled to the data repository, the process archiving module operable to:
receive the event data;
determine process data associated with the process;
generate process metadata from the event data and the process data;
generate a first dataset entry for the process, the first dataset entry including the process metadata;
retrieve an archived data model describing second dataset entries in the data repository;
determine a relationship between the first dataset entry and the second dataset entries by applying the archived data model to the first dataset entry; and
store the first dataset entry in the data repository based on the relationship between the first dataset entry and the second dataset entries.

2. The system of claim 1, wherein the process archiving module is further operable to generate the process metadata by applying machine learning to the event data and the process data.

3. The system of claim 1, wherein:
the process metadata includes a process parameter describing the process; and
the process archiving module is further operable to apply the archived data model to the first dataset entry by identifying a cluster of second dataset entries for the first dataset entry using a clustering algorithm, the clustering algorithm being used for clustering based on the process parameter.

4. The system of claim 1, further comprising a real-time analysis module coupled to the data repository to retrieve dataset entries, the real-time analysis module operable to:
generate a real-time view associated with one or more analytic outputs using the dataset entries; and
store the real-time view in a process storage.

5. The system of claim 1, further comprising a batch analysis module coupled to the data repository to retrieve dataset entries, the batch analysis module operable to:
pre-compute a batch view associated with one or more analytic outputs using the dataset entries; and
store the batch view in a process storage.

6. The system of claim 1, further comprising an archived data managing module communicatively coupled to the data repository, the archived data managing module operable to:
determine a consuming pattern associated with dataset entries in the data repository;
determine a process parameter based on the consuming pattern; and
cluster the dataset entries in the data repository based on the determined process parameter to generate the archived data model.

7. The system of claim 1, wherein:
the process archiving module is further operable to determine a value of a data attribute from the event data associated with the process and generate the first dataset entry, the first dataset entry including the determined value of the data attribute; and
the system further comprises:
an archived data managing module configured to organize the second dataset entries in the data repository based on the data attribute;
an analytic module configured to store a pre-computed view associated with an analytic output in an analytic profile storage to generate a unified view; and
a profile enabling module coupled to and controlling the process archiving module, the archived data managing module, and the analytic module, the profile enabling module configured to receive a selected analytic profile, and identify the data attribute and the analytic output associated with the selected analytic profile.

8. A method comprising:
receiving event data associated with a process;
responsive to receiving the event data, determining process data associated with the process;
generating process metadata from the event data and the process data;
generating a first dataset entry for the process, the first dataset entry including the process metadata;
retrieving an archived data model describing second dataset entries in a data repository;
determining a relationship between the first dataset entry and the second dataset entries by applying the archived data model to the first dataset entry; and
storing the first dataset entry in the data repository based on the relationship between the first dataset entry and the second dataset entries.

9. The method of claim 8, wherein the first dataset entry includes the event data, the process data, and the process metadata.

10. The method of claim 9, wherein:
the process metadata includes a process parameter describing the process; and
determining the relationship between the first dataset entry and the second dataset entries by applying the archived data model to the first dataset entry includes identifying a cluster of second dataset entries for the first dataset entry using a clustering algorithm, the clustering algorithm being used for clustering based on the process parameter.

11. The method of claim 10, wherein storing the first dataset entry in the data repository includes:
determining a dataset associated with the cluster of second dataset entries; and
updating the determined dataset to include the first dataset entry.

12. The method of claim 9, further comprising:
receiving a selection of an analytic profile, the analytic profile specifying an analytic output to be provided; and
identifying a data attribute associated with the analytic profile;
wherein generating the first dataset entry includes:
determining a value of the data attribute from the event data associated with the process; and
generating the first dataset entry for the process, the first dataset entry including the determined value of the data attribute.

13. The method of claim 12, further comprising:
organizing the second dataset entries in the data repository based on the data attribute; and
storing a pre-computed view associated with the analytic output in an analytic profile storage to generate a unified view for the analytic output.

14. The method of claim 8, further comprising:
determining a consuming pattern associated with dataset entries in the data repository;
determining a process parameter based on the consuming pattern; and
clustering the dataset entries based on the determined process parameter to generate the archived data model.

15. The method of claim 14, wherein the archived data model includes a first cluster of dataset entries and a second cluster of dataset entries, and the method further comprises:
aggregating the first cluster of dataset entries into a first dataset;
aggregating the second cluster of dataset entries into a second dataset; and
storing the first dataset in a first folder and the second dataset in a second folder of the data repository, the first folder and the second folder being organized based on the archived data model.

16. A system comprising:
means for receiving event data associated with a process;
means for determining process data associated with the process;
means for generating process metadata from the event data and the process data;
means for generating a first dataset entry for the process, the first dataset entry including the process metadata;
means for retrieving an archived data model describing second dataset entries in a data repository;
means for determining a relationship between the first dataset entry and the second dataset entries by applying the archived data model to the first dataset entry; and
means for storing the first dataset entry in the data repository based on the relationship between the first dataset entry and the second dataset entries.

17. The system of claim 16, wherein the first dataset entry includes the event data, the process data, and the process metadata.

18. The system of claim 17, wherein:
the process metadata includes a process parameter describing the process; and
the means for determining the relationship between the first dataset entry and the second dataset entries identifies a cluster of second dataset entries for the first dataset entry using a clustering algorithm, the clustering algorithm being used for clustering based on the process parameter.

19. The system of claim 17, further comprising:
means for receiving a selection of an analytic profile, the analytic profile specifying an analytic output to be provided;
means for identifying a data attribute associated with the analytic profile;
means for organizing the second dataset entries in the data repository based on the data attribute; and
means for storing a pre-computed view associated with the analytic output in an analytic profile storage to generate a unified view for the analytic output,
wherein the means for generating the first dataset entry determines a value of the data attribute from the event data associated with the process and generates the first dataset entry for the process, the first dataset entry including the determined value of the data attribute.

* * * * *